United States Patent [19]
Kosugi et al.

[11] Patent Number: 5,189,410
[45] Date of Patent: Feb. 23, 1993

[54] DIGITAL CROSS CONNECT SYSTEM

[75] Inventors: Toru Kosugi, Ohmiya; Yuichi Hashimoto, Utsunomiya; Masayuki Tanaka, Ashikaga; Katsuichi Ohara, Tokyo; Takahiro Furukawa; Makoto Aoki, both of Oyama, all of Japan

[73] Assignee: Fujitsu Limited, Japan

[21] Appl. No.: 635,439

[22] Filed: Dec. 28, 1990

[30] Foreign Application Priority Data

Dec. 28, 1989 [JP] Japan .................................. 1-343465
Jan. 19, 1990 [JP] Japan .................................. 2-10299
Jan. 19, 1990 [JP] Japan .................................. 2-10300

[51] Int. Cl.⁵ .......................... H04Q 11/00; H04J 3/00
[52] U.S. Cl. ........................... 340/825.14; 340/825.79; 370/60.1; 370/94.2; 370/58.3; 370/105.1; 359/117
[58] Field of Search .................. 340/825.14, 825.79; 370/60, 60.1, 94.1, 94.2, 58.1, 58.2, 58.3, 105.1, 100, 84; 359/117, 115

[56] References Cited

U.S. PATENT DOCUMENTS

| | | | |
|---|---|---|---|
| 4,964,095 | 10/1990 | Tyrell et al. | 370/58.1 |
| 4,967,405 | 10/1990 | Upp et al. | 370/58.1 |
| 4,998,242 | 3/1991 | Upp | 370/60 |
| 5,001,708 | 3/1991 | Williams et al. | 370/105.1 |
| 5,033,044 | 7/1991 | Williams et al. | 370/105.1 |

Primary Examiner—Donald J. Yusko
Assistant Examiner—Brian Zimmerman
Attorney, Agent, or Firm—Staas & Halsey

[57] ABSTRACT

A digital cross connect system includes reception interface parts for converting an input line signal into a VT signal having a VT frame format in conformance with synchronous optical network (SONET) standards, a switching part for cross connecting the VT signal received from the reception interface parts, and transmission interface parts for converting the cross connected VT signal received from the switching parts into a line signal. The reception interface part inserts a frame synchronizing signal within a reserved path overhead part of the VT signal, and the transmission interface part achieves frame synchronization of the VT signal in response to the frame synchronizing signal.

7 Claims, 21 Drawing Sheets 1.576 Mb/S FRAME FORMAT

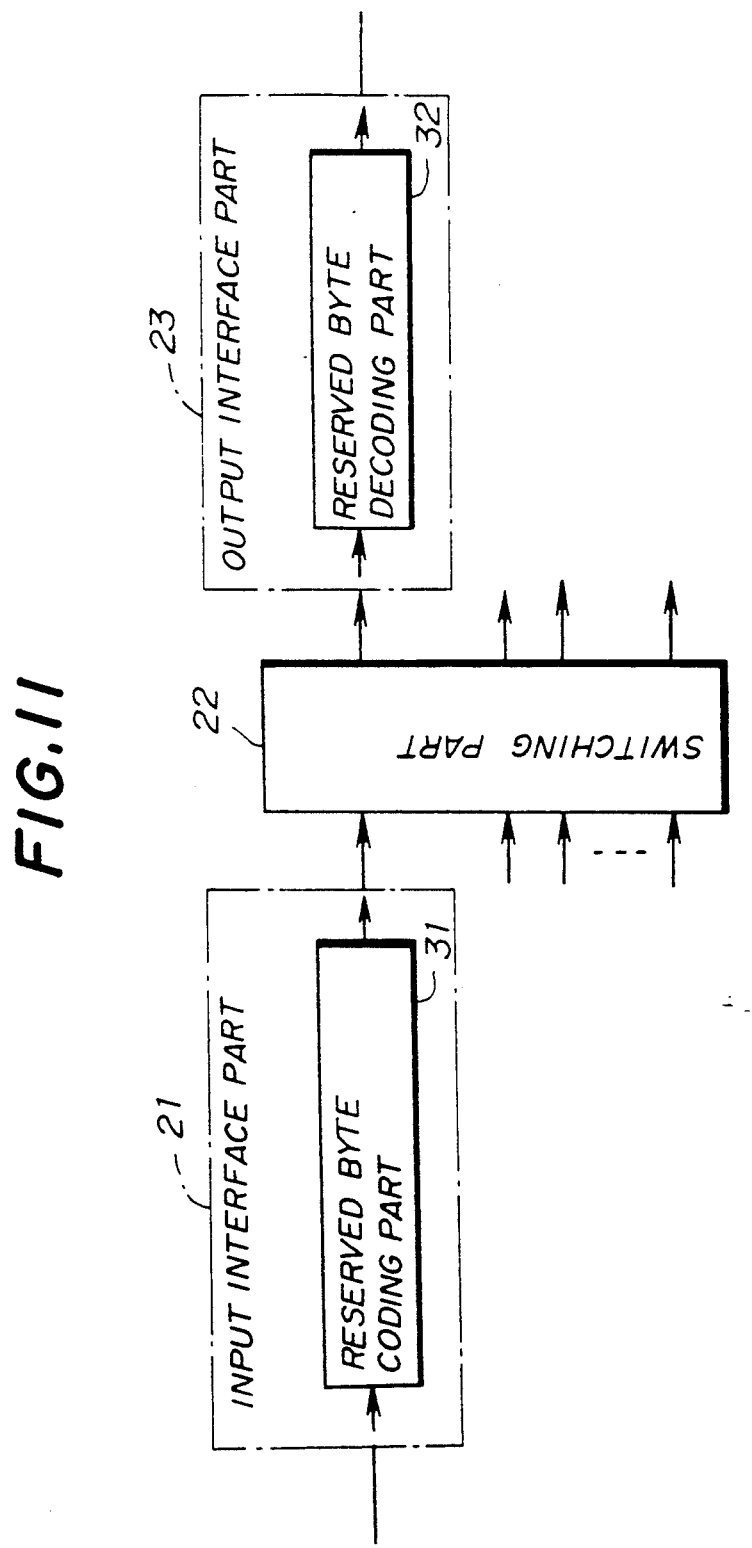

FIG. 16
FIG. 16a
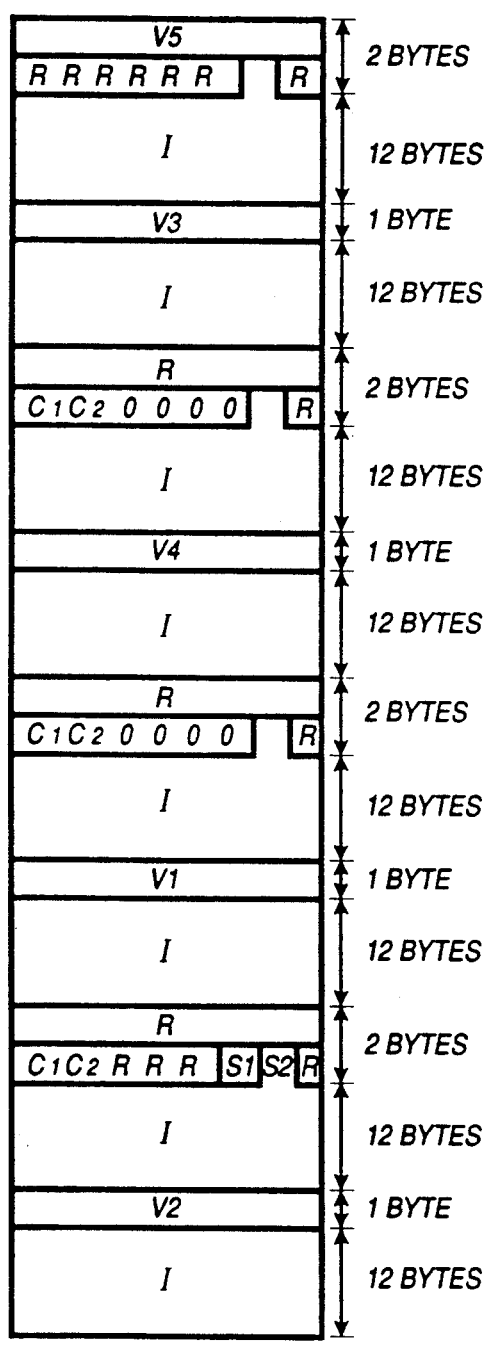
FIG. 16b
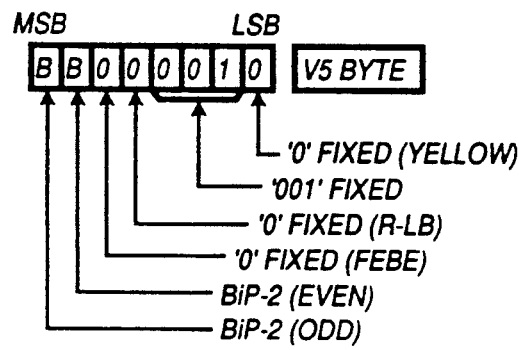
FIG. 16c
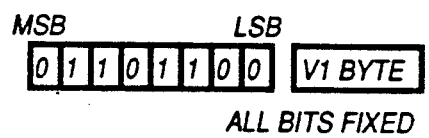
ALL BITS FIXED
FIG. 16d
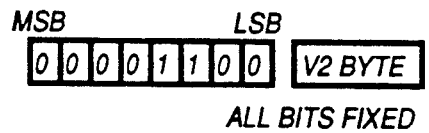
ALL BITS FIXED
FIG. 16e
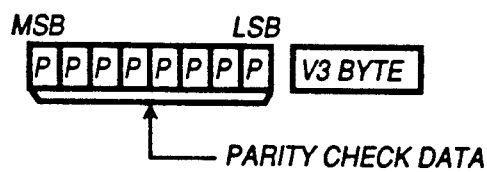
FIG. 16f
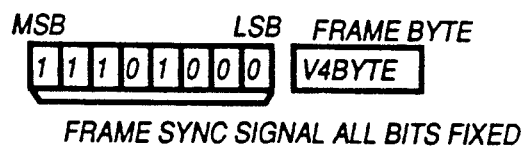
FRAME SYNC SIGNAL ALL BITS FIXED

DIGITAL CROSS CONNECT SYSTEM

BACKGROUND OF THE INVENTION

The present invention generally relates to digital cross connect systems, and more particularly to a digital cross connect system which cross connects VT signals of the synchronous optical network (SONET) with frame phase synchronization.

Recently, the SONET standards have been newly prescribed in the United States. Hence, there are demands to realize a digital cross connect system which can not only cross connect the line signals such as the conventional ASYNC-DS3, DS2, DS1C and DS1 but also cross connect signals such as OC-1 and OC-3 which are in conformance with the SONET standards. When the frame structure used for the signal processing in such a digital cross connect system is the SONET-VT format, there is a need for a signal processing method which achieves frame synchronization because no frame synchronizing signal is used in the SONET-VT format.

FIG.1 generally shows a conventional digital cross connect system which terminates only the line signals such as the conventional ASYNC-DS3, DS2, DS1C and DS1. The digital cross connect system includes reception interface parts 51, a switching part 52, transmission interface parts 53 and a control part 54. The reception interface part 51 receives the line signals such as the ASYNC-DS3, DS2, DS1C and DS1 and converts the line signals into frames. The switching part 52 cross connects output signals of the reception interface parts 51. The transmission interface part 53 converts the cross connected signal from the switching part 52 into a line signal and transmits the same. The control part 54 controls the switching part 52.

A frame format shown in FIG.2 is used for the signal processing within the system. In FIG. 2, ɸ denotes a time slot indicating an input #1 of the DS1 signal, F0 and F1 denote frame synchronizing signals, Ci denotes a stuff control signal and V1 denotes a time slot for stuffing.

When an attempt is made to terminate the 0C signal of the newly prescribed SONET with the conventional frame format used for the signal processing within the system, it is impossible to terminate this OC signal because the transmission capacity of the frame is insufficient to directly process the OC signal.

For this reason, in order to not only terminate the line signals such as the conventional ASYNC-DS3, DS2, DS1C and DS1 but also the OC signal of the SONET standards, a new frame format is required for the signal processing within the system and the SONET-VT format may be used as the new frame format.

By using of the VT format for the signal processing within the system, it becomes possible to cross connect the STS-1 signal or the DS3 signal and the VT1.5 signal inserted in the OC signal as they are without terminating these signals. In addition, when terminating the VT1.5 signal, there is an advantage in that the V1, V2, V3 and V4 bytes can be simply converted by replacing these bytes by frames.

However, no frame identification pattern (frame synchronizing pattern) is provided in the VT format. For this reason, when a phase error is introduced in the VT signals having the VT format on the channels output from the reception interface parts 51 due to a transmission delay within the system, it becomes impossible to carry out a normal signal processing in the switching part 52 or the transmission interface parts 53.

FIG.3 shows the frame format of the VT signal in conformance with the SONET standards. The VT frame includes four VT payload pointer parts V1, V2, V3 and V4, and the VT payload pointer parts V1, V2, V3 and V4 respectively have a data part having a bytes added thereto. The number of a bytes of the data part is a=26 in VT1.5, a=35 in VT2, a=53 in VT3 and a=107 in VT4.

For example, the data in the data part has a format shown in FIG.4 with 104 bytes in the case of VT1.5 frame. This data is divided into four and is distributed and arranged in each data part of the VT1.5 frame. In FIG.4, I denotes an information bit, O denotes an overhead bit, C denotes a stuff control bit, S denotes a stuff bit and R denotes a reserved bit (fixed stuff bit). The position of V5, that is, the distance between V2 and V5, is determined by contents of the V1 and V2 bytes.

As described above, the VT signal of the SONET standards does not have a frame synchronizing signal. For this reason, in order to cross connect the VT signal, it is necessary to add a frame synchronizing signal by some means. As one conceivable method, it is possible to add the frame synchronizing signal on the outside of the VT frame format as shown in FIG.5.

However, when the frame synchronizing signal is added to the VT frame as an additional byte, the signal frequency processed within the system becomes high. For example, in the case of the VT1.5 frame, the signal frequency is 1.728 Mbps, but the signal frequency becomes (1.728 M + A) bps when the frame synchronizing signal is added.

In addition, in order to add the frame synchronizing signal to the VT frame, it is necessary to temporarily store the VT frame and a memory is required for this storage. As a result, the need to temporarily store the VT frame not only enlarges the scale of the hardware but also introduces an undesirable signal delay caused by the writing and reading of the VT frame to and from the memory.

On the other hand, the transmission delay of each channel signal is inevitably caused by the difference in the lengths of transmission paths due to the positions of the transmission and reception interface parts of each of the channels when the digital cross connect system is assembled on a single frame or the positions of the transmission and reception interface parts of each of the channels when the digital cross connect system is distributively arranged within a single building, as shown in FIG.6. Hence, measures must be taken against this transmission delay.

As one measure, FIG.7 shows a conceivable system using a phase absorbing means 56. In other words, the switching part 52 supplies to all channel interface parts 55 a reference timing signal which is common to all channels. The channel interface part 55 functions both as a transmission interface part and a reception interface part. In addition, a phase absorbing means 56 is provided at the input/output side of the switching part 52.

According to this conceivable system shown in FIG.7, the reception part of each channel interface part 55 transmits the reception signal of its own channel in response to the reference timing signal which is output from the switching part 52. The signals of each of the channels have a phase error of one bit or more when input to the phase absorbing means 56 due to the difference in the lengths of transmission paths. However, the phase absorbing means 56 adjusts the phases of the signals for each of the channels so that the signals are input to the switching part 52 with the same phase.

Furthermore, the signal which is subjected to the cross connect process in the switching part 52 is transmitted to the transmission part of each interface part 55 similarly in response to the reference timing signal, and a phase error similar to the above also occurs. Hence, the phase absorbing means 56 matches the phases of the signals to the reference timing.

However, when the phase absorbing means 56 is used, it is necessary to adjust the setting of the phase absorbing means 56 for each system when starting or initializing the system because the conditions such as the set up position of the channel interface parts 55 differ for each individual system. As a result, the set up procedure of the system increases, and moreover, a skilled maintenance person is needed for the adjustment because the timing adjustment is delicate and requires skill. In addition, the provision of the phase absorbing means 56 enlarges the scale of the hardware of the system.

SUMMARY OF THE INVENTION

Accordingly, it is a general object of the present invention to provide a novel and useful digital cross connect system in which the problems described above are eliminated.

Another and more specific object of the present invention is to provide a digital cross connect system comprising first interface means including a plurality of first interface circuits for converting an input line signal into a VT signal having a VT frame format in conformance with synchronous optical network (SONET) standards, switching means for cross connecting the VT signal received from the first interface means, and second interface means including a plurality of second interface circuits for converting the cross connected VT signal received from the switching means into a line signal, where each first interface circuit of the first interface means includes signal inserting means for inserting a frame synchronizing signal within a reserved path overhead part of the VT signal, and each second interface circuit of the second interface means includes synchronization means for achieving frame synchronization of the VT signal in response to the frame synchronizing signal. According to the digital cross connect system of the present invention, it is unnecessary to provide a memory for adding the frame synchronizing information, and it is possible to prevent unnecessary signal delay and enlarging of the hardware scale. In addition, it is unnecessary to provide a phase absorbing means and there is no need to carry out the troublesome phase adjustment when starting the system.

Still another object of the present invention is to provide the digital cross connect system described above, in which the first interface circuit produces the frame synchronizing signal by inverting one or a plurality of predetermined bits of the reserved path overhead part of the VT signal. According to the digital cross connect system of the present invention, the transparency of the system is maintained even when a line error occurs.

A further object of the present invention is to provide a digital cross connect system comprising first interface means including a plurality of first interface circuits for converting an input line signal into a VT signal having a VT frame format in conformance with synchronous optical network (SONET) standards, switching means for cross connecting the VT signal received from the first interface means, and second interface means including a plurality of second interface circuits for converting the cross connected VT signal received from the switching means into a line signal, where each first interface circuit of the first interface means includes path check information inserting means for inserting signal path check information within a reserved path overhead part of the VT signal, and each second interface circuit of the second interface means includes path check means for making a path check by detecting the signal path check information in the VT signal. According to the digital cross connect system of the present invention, it is possible to check and confirm the signal path within the system at a high speed and with a high reliability. In addition, even when the system is expanded, it is possible to prevent considerable increase in the load on a microcomputer which controls the switching part.

Other objects and further features of the present invention will be apparent from the following detailed description when read in conjunction with the accompanying drawings.

BRIEF DESCRIPTION OF THE DRAWINGS

FIG. 11 is a system block diagram showing the first embodiment of the digital cross connect system according to the present invention;

FIG. 16 and 16a through 16f show a frame format of the VT1.5;

DESCRIPTION OF THE PREFERRED EMBODIMENTS

Figure 9:
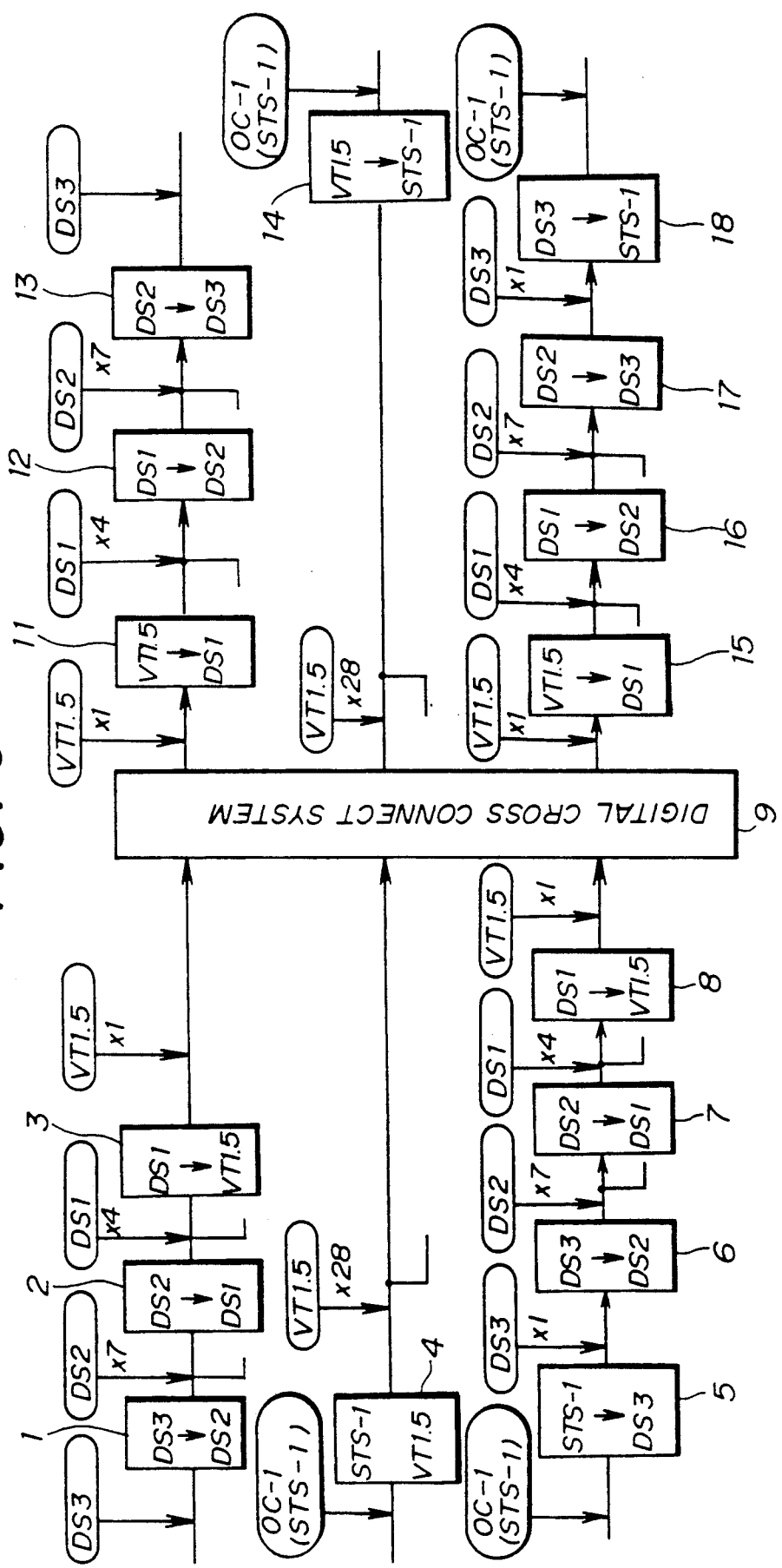
FIG. 9 is a system block diagram showing a general system structure to which a digital cross connect system of the present invention is applied.

FIG. 9 shows a general system structure to which a digital cross connect system of the present invention is applied, so as to facilitate the understanding of the present invention. In FIG. 9, blocks 1, 2 and 3 respectively carry out conversions DS3-to-DS2, DS2-to-DS1 and DS1-to-VT1.5. A block 4 carries out a conversion STS-1-to-VT1.5. Blocks 5, 6, 7 and 8 respectively carry out conversions STS-1-to-DS3, DS3-to-DS2, DS2-to-DS1 and DS1-to-VT1.5. A digital cross connect system 9 receives signals from the blocks 3, 4 and 8.

On the other hand, blocks 11, 12 and 13 respectively carry out conversions VT1.5-to-DS1, DS1-to-DS2 and DS2-to-DS3. A block 14 carries out a conversion VT1.5-to-STS-1. Blocks 15, 16, 17 and 18 respectively carry out conversions VT1.5-to-DS1, DS1-to-DS2, DS2-to-DS3 and DS3-to-STS-1. The digital cross connect system 9 supplies signals to the blocks 11, 14 and 15. In other words, the digital cross connect system 9 cross connects the signal received from one of the blocks 3, 4 and 8 to one of the blocks 11, 14 and 15.

Figure 10:
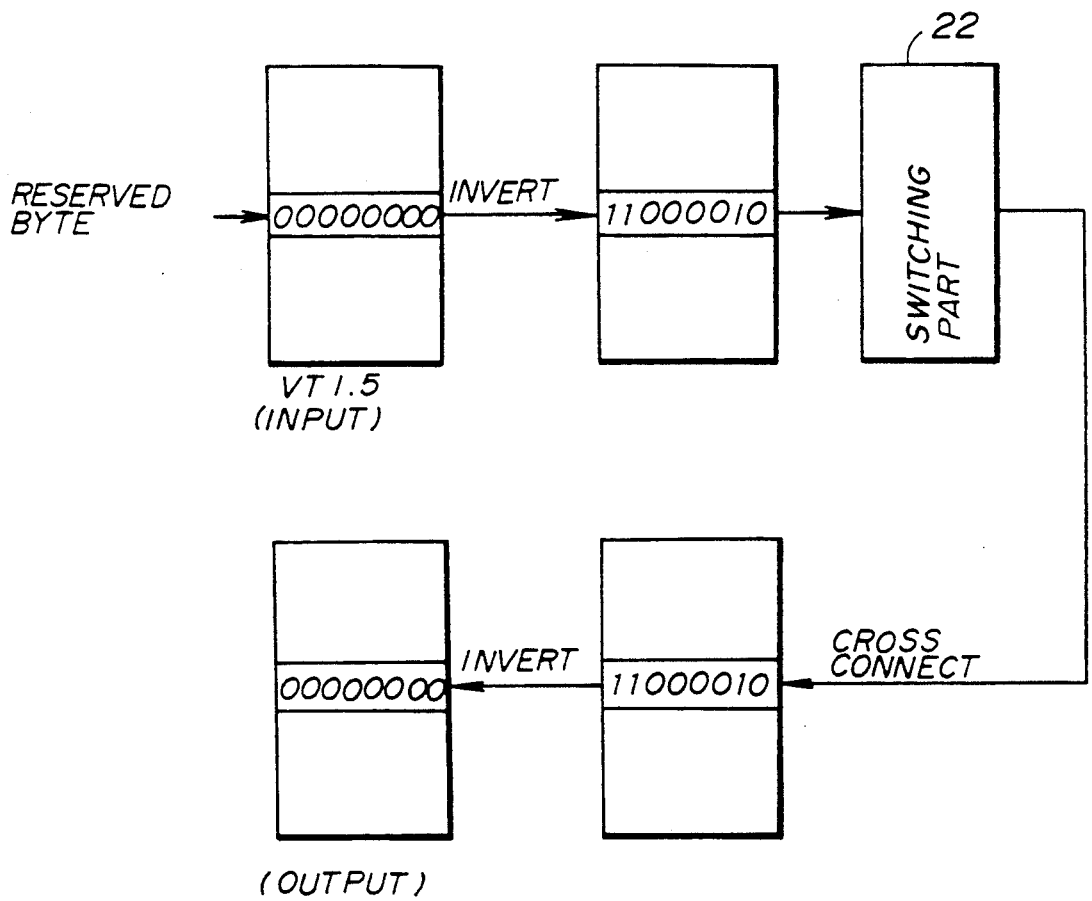
FIG. 10 is a diagram for explaining the operating principle of a first embodiment of the digital cross connect system according to the present invention.

A description will be given of the operating principle of a first embodiment of the digital cross connect system according to the present invention, by referring to FIG. 10. In this embodiment, the digital cross connect system inverts one or a plurality of predetermined bits of a reserved bit part of the VT signal, so as to add to the VT signal synchronizing information which is used for the signal processing within the system.

Figure 4:
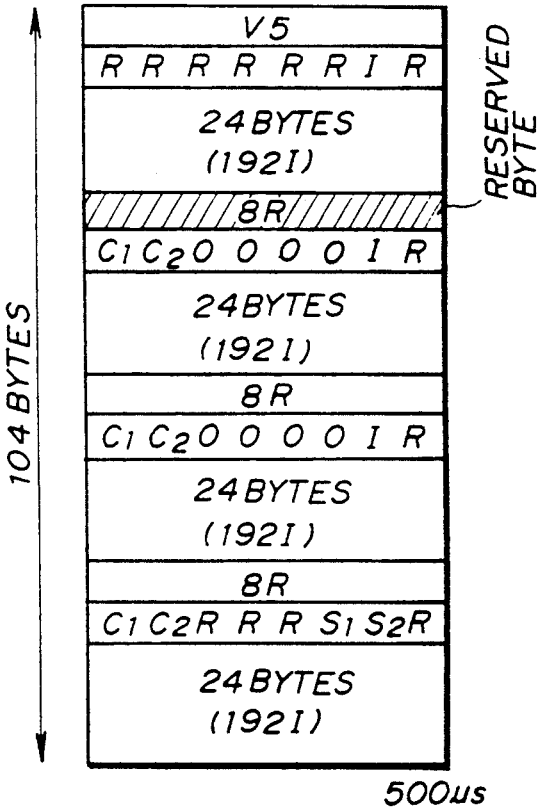
FIG. 4 shows a data format of the VT1.5 frame.
Figure 5:
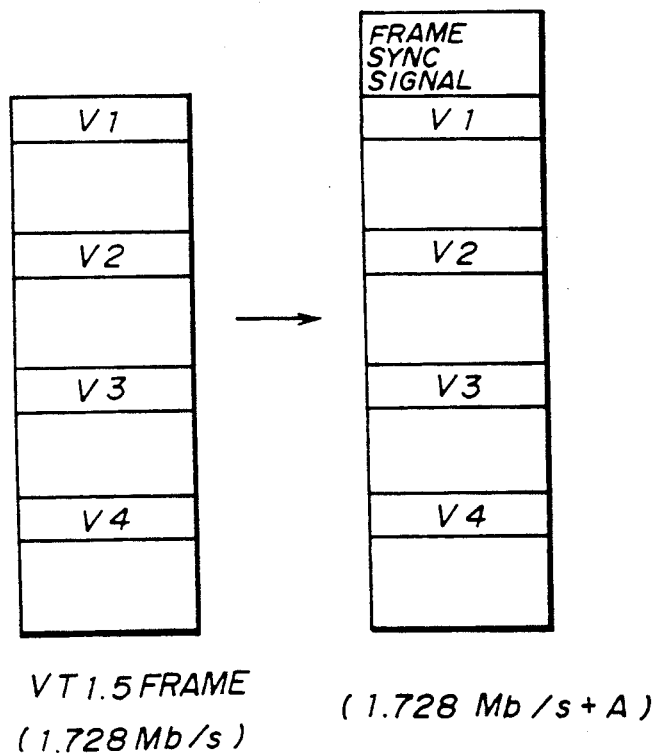
FIG. 5 is a diagram for explaining a conceivable method of adding a frame synchronizing signal to the VT1.5 frame.
Figure 6:
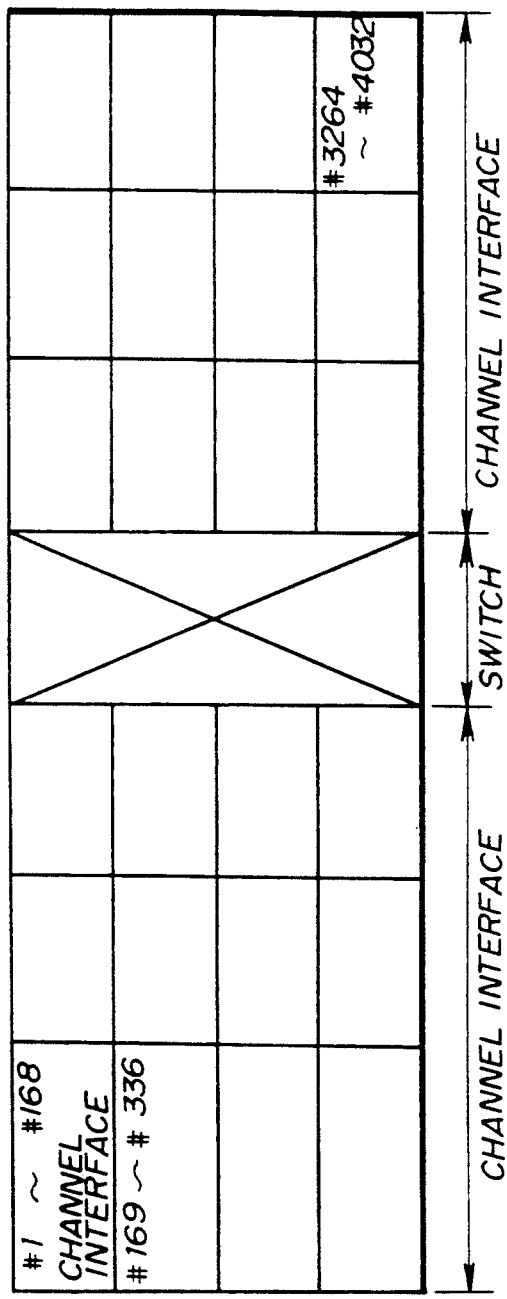
FIG. 6 is a diagram for explaining a system structure of the conventional digital cross connect system.
Figure 7:
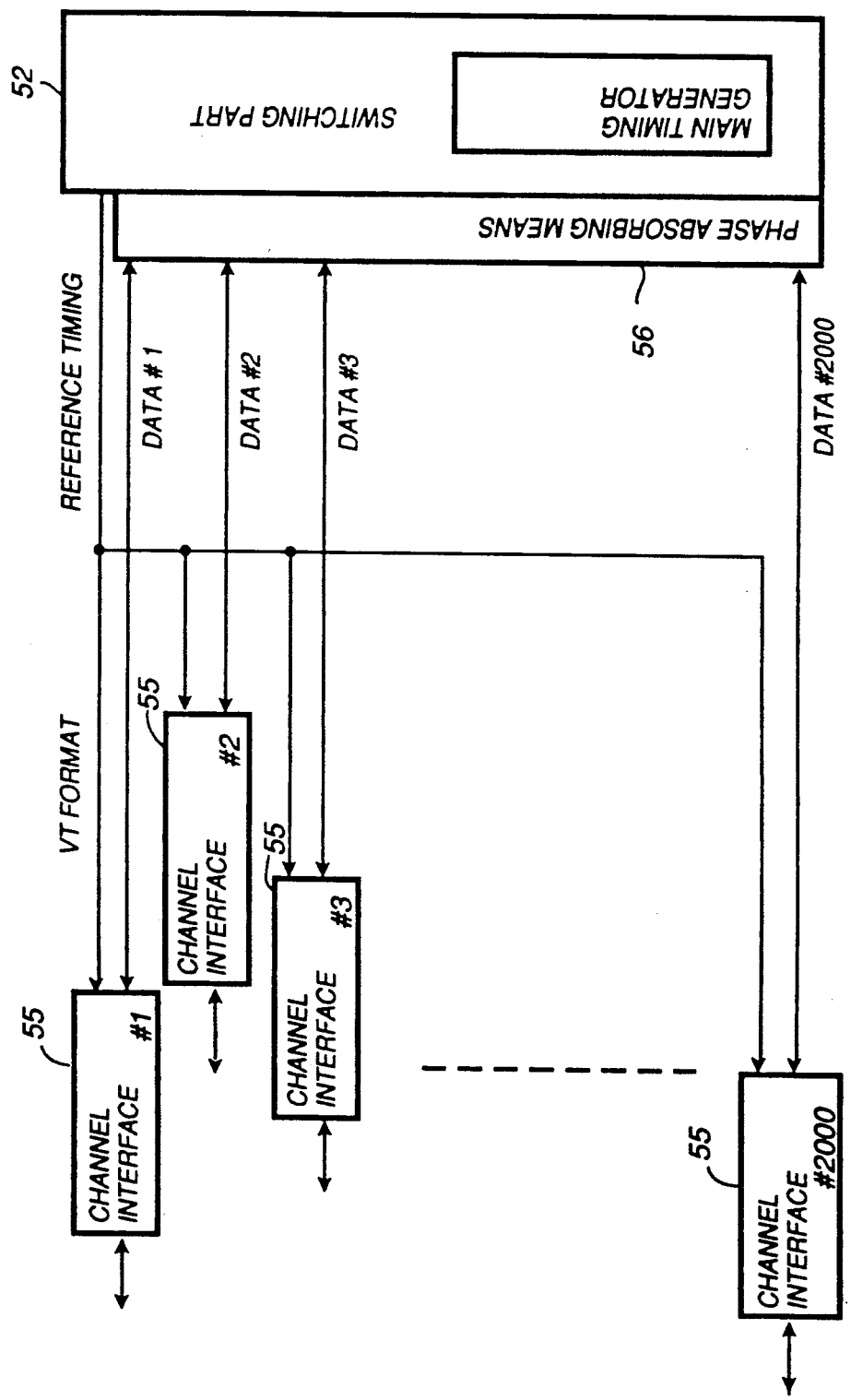
FIG.7 is a system block diagram showing a conceivable digital cross connect system having a phase absorbing means.
Figure 8:
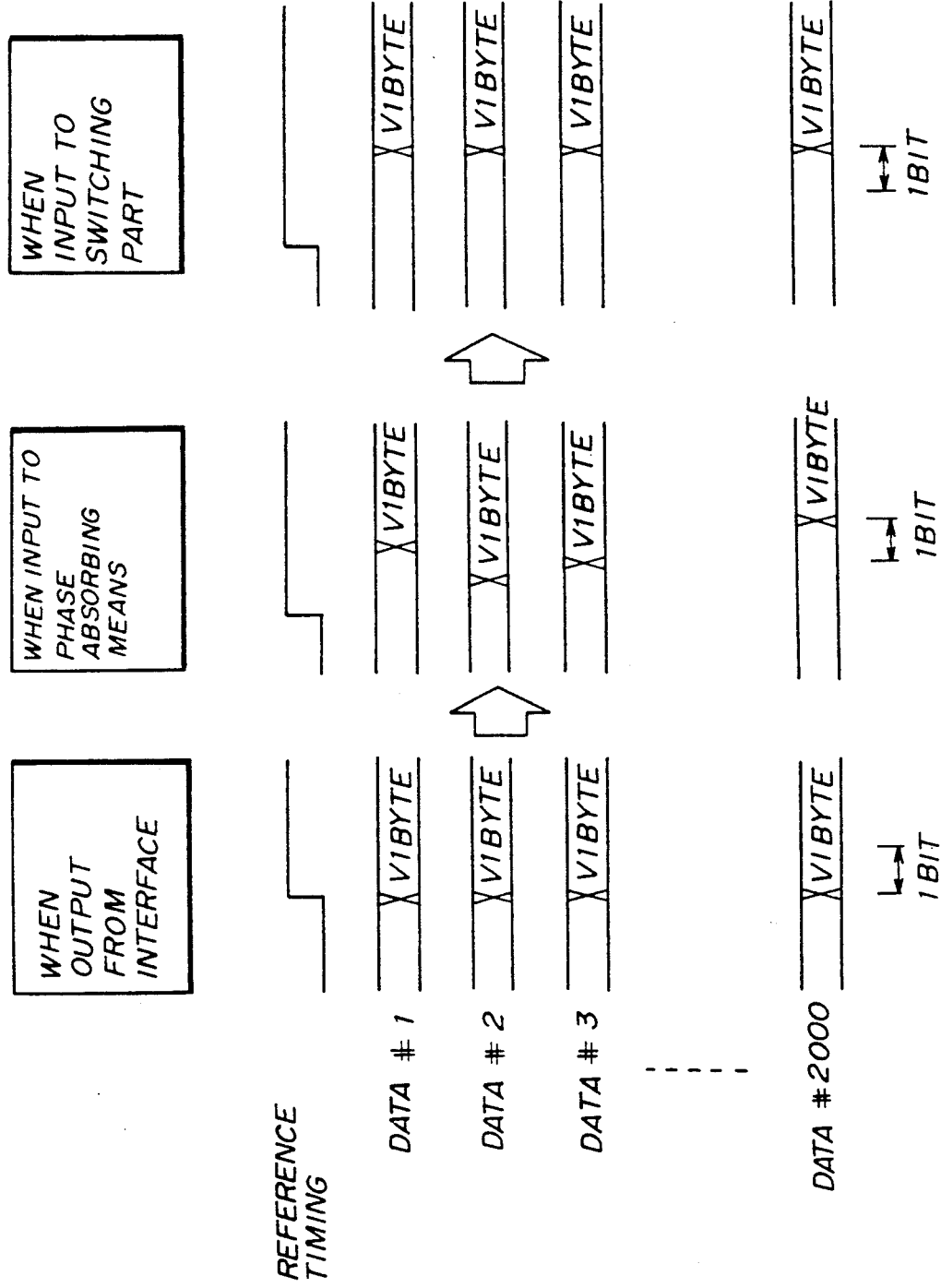
FIG. 8 is a diagram for explaining an operation of the phase absorbing means shown in FIG. 7.

For example, the reserved byte consisting of 8 bits indicated by hatchings in FIG. 4 is used as the reserved bit part of the VT signal. The synchronizing information such as a frame synchronizing signal and path identifier for identifying the path is inserted in the reserved bit part and used within the system.

However, since the reserved byte is used for the calculation of the parity bits existing in the VT frame, when the content of the reserved byte changes due to error bit generation caused by line error or the like, the transparency of the system cannot be maintained if the reserved byte were simply replaced by fixed synchronizing information.

In other words, when the content of the reserved byte originally is a fixed data "00000000" but changes to "00000010" due to the line error, for example, the digital cross connect system must cross connect this information as it is. However, if the reserved byte were simply replaced by a fixed frame synchronizing signal "11000010" on the input side and used for the frame synchronization within the system, for example, the data "00000010" which is affected by the line error is changed to "00000000" on the output side when the reserved byte is changed back to the original fixed data "00000000" on the output side and the transparency is lost.

Accordingly, in this embodiment, the synchronizing information is formed by inverting one or a plurality of predetermined bits of the reserved byte for use in the signal processing within the system, and the inverted predetermined bit or bits are inverted back to the original state after use when restoring the reserved byte, so that the transparency of the system is ensured.

For example, when the frame synchronizing signal is "11000010", the frame synchronizing signal is formed by inverting first, second and seventh bits from the most significant bit (MSB) using the fact that the reserved byte is fixed to "00000000". After the frame synchronism is achieved, the inverted bits are inverted again to restore the reserved byte to its original state.

Hence, even if the reserved byte were "00000010" due to the line error, "11000000" is obtained by inverting the first, second and seventh bits from the MSB. After the cross connection, the inverted bits are inverted again to restore the reserved byte to its original state which is "00000010". As a result, the line error passes the digital cross connect system as it is and the transparency of the system is maintained. In this case, "11000000" differs from the frame synchronizing signal, but no problems will be introduced if an appropriate number of stages of frame synchronization protection is made.

FIG. 11 generally shows the first embodiment of the digital cross connect system according to the present invention. An input interface part 21 receives a line signal from a transmission path such as the DS1 signal and converts the line signal into the VT signal such as the VT1.5. A switching part 22 carries out the cross connection. An output interface part 23 converts the VT signal after the cross connection back into the original line signal and outputs the line signal on the transmission path. Only one input interface part 21 and one output interface part 23 are shown in FIG. 11, but a plurality of input interface parts 21 and a plurality of output interface parts 23 are actually provided.

The input interface part 21 has a reserved byte coding part 31 which encodes the reserved byte (the byte part is indicated by the hatchings in FIG. 4) within the VT signal into the frame synchronizing signal which is used within the system and transmits the frame synchronizing signal to the switching part 22. On the other hand, the output interface part 23 has a reserved byte decoding part 32 which decodes the frame synchronizing signal inserted in the reserved byte position within the VT signal after the cross connection back into the original reserved byte. It is assumed for the sake of convenience that the frame synchronizing signal used within the system has a pattern "11000010".

Figure 12:
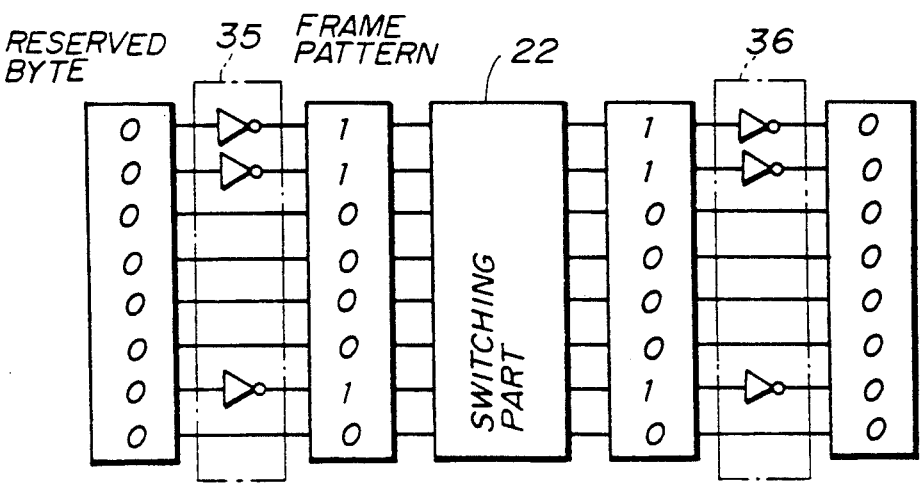
FIG. 12 is a system block diagram showing an embodiment of reserved byte coding and decoding parts of the first embodiment of the digital cross connect system.

As shown in FIG. 12, the reserved byte coding part 31 and the reserved byte decoding part 32 may respectively be made up of inverter circuits 35 and 36. The inverter circuit 35 which forms the reserved byte coding part 31 has three inverter elements which are arranged to invert the first, second and seventh bits of the reserved byte from the MSB, and the remaining third, fourth, fifth, sixth and eighth bits are passed as they are. Similarly, the inverter circuit 36 which forms the reserved byte decoding part 32 has three inverter elements which are arranged to invert the first, second and seventh bits of the reserved byte of the VT signal from the MSB, and the remaining third, fourth, fifth, sixth and eighth bits are passed as they are.

In this embodiment, the reserved byte has a fixed value "00000000". When this fixed reserved byte passes through the inverter circuit 35 of the input interface part 21, the first, second and seventh bits are inverted. Hence, the reserved byte is converted into a frame synchronizing signal "11000010" and is supplied to the switching part 22. The VT signal which is cross connected in the switching part 22 is supplied to the output interface part 23 and the frame synchronization is achieved by use of the frame synchronizing signal which is inserted in the reserved byte position within the VT signal. When the frame synchronizing signal passes through the inverter circuit 36 of the output interface part 23, the first, second and seventh bits from the MSB are inverted and the reserved byte is restored back into its original value "00000000".

Even when the reserved byte at the input interface part 21 includes one or more erroneous bits due to the line error and is not "00000000", the reserved byte decoding part 32 can restore the reserved byte including the one or more erroneous bits. Therefore, the transparency of the system is maintained.

When the reserved byte includes one or more erroneous bits due to the line error, the pattern of the frame synchronizing signal does not become "11000010". However, this does not introduce problems when the error rate is small and the a frame synchronization protection circuit is provided.

Figure 13:
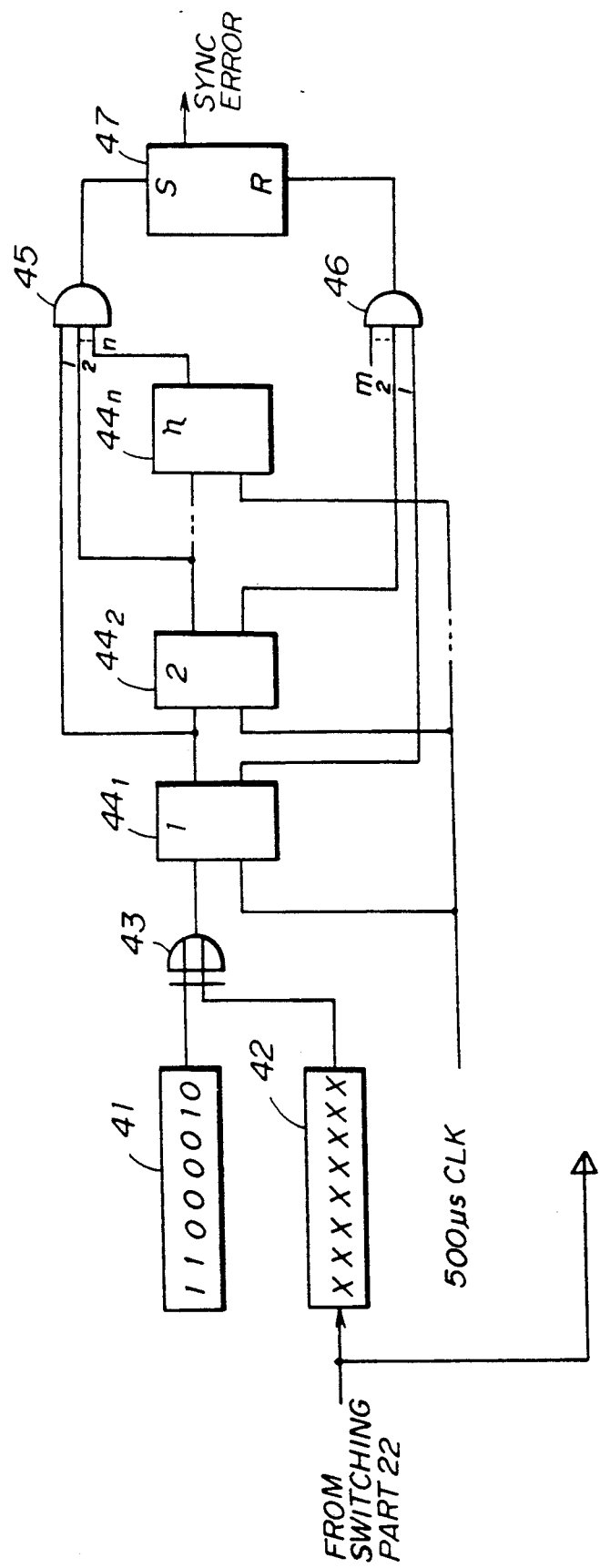
FIG. 13 is a system block diagram showing an embodiment of a frame synchronization protection circuit.

FIG.13 shows an embodiment of the frame synchronization protection circuit. This frame synchronization protection circuit includes registers 41 and 42, gates 43, 45 and 46, latch circuits $44_1$ through $44_n$, and an SR flip-flop 47 which are connected as shown. Forward protection is provided in n stages, and backward protection is provided in m stages.

The register 41 stores the pattern "11000010" of the frame synchronizing signal. The frame synchronizing signal, that is, the reserved byte within the VT signal from the switching part 22 is stored in the register 42. The contents of the registers 41 and 42 are respectively passed through the gate 43 and (successively supplied to the latch circuits $44_1$ through $44_n$. The latch circuits $44_1$ through $44_n$ respectively latch the incoming signals in response to a clock signal CLK. First output signals of the latch circuits $44_1$ through $44_m$ are supplied to the gate 46, and an output signal of the gate 46 is supplied to a reset terminal R of the SR flip-flop 47, where $n > m$. On the other hand, second output signals of the latch circuits $44_1$ through $44_n$ are supplied to the gate 45, and an output signal of the gate 45 is supplied to a set terminal S of the SR flip-flop 47. A synchronization error can be detected from an output signal of the SR flip-flop 47.

When the error rate is large (for example, in the order of $10^{-1}$), the frame synchronization cannot be achieved after the cross connection and the VT signal is all set to "1" and transmitted. In this case, the transparency of the system is of course lost, but the present invention does not consider such an exceptional case.

Various modifications of the first embodiment are possible. For example, the VT signal is not limited to the VT1.5, and the first embodiment is similarly applicable to other VT signals such as the VT2, VT3 and VT6. In addition, the information which is inserted in the reserved byte is not limited to the frame synchronizing signal, and other synchronizing information may be inserted such as the path identifier.

Figure 14:
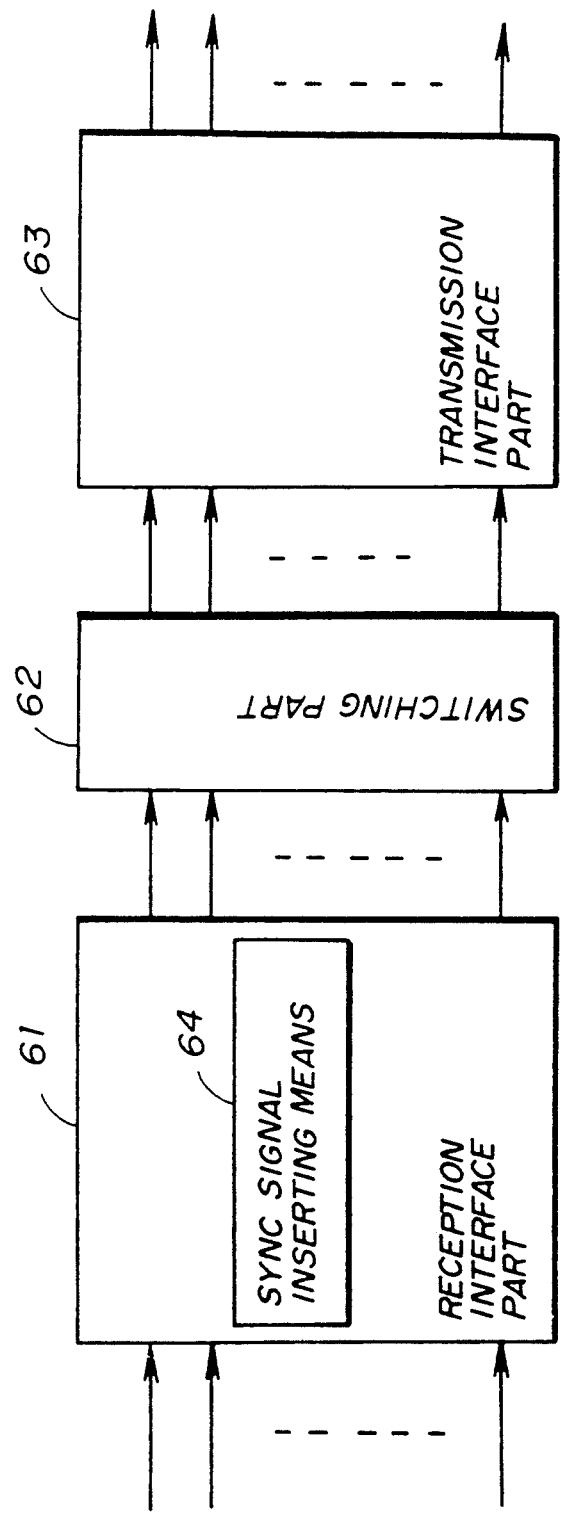
FIG. 14 is a system block diagram for explaining the operating principle of a second embodiment of the digital cross connect system according to the present invention.

Next, a description will be given of the operating principle of a second embodiment of the digital cross connect system according to the present invention, by referring to FIG.14. The digital cross connect system includes a reception interface part 61, a switching part 62 and a transmission interface part 63. The reception interface part 61 receives a line signal and converts the line signal into a VT signal having a VT frame format. The switching part 62 cross connects the VT signal from the reception interface part 61. The transmission interface part 63 converts the VT signal from the switching part 62 into the line signal and outputs the line signal.

The reception interface part 61 has a synchronizing signal inserting means 64 for inserting a frame synchronizing signal in an undefined (or reserved) VT path overhead part within the VT signal. This frame synchronizing signal is used within the system for carrying out the frame synchronism of the VT signal.

Figure 3:
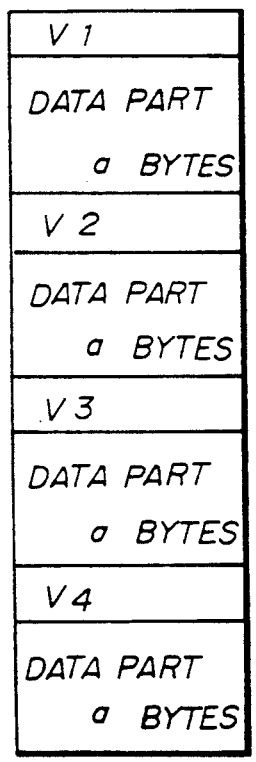
FIG. 3 shows a VT frame format.

As described above in conjunction with FIG.3, the VT frame format of the SONET has four VT path overhead parts (or VT payload pointer parts) V1, V2, V3 and V4, and the VT path overhead parts V1, V2, V3 and V4 respectively have a data part having a bytes added thereto. The number of a bytes of the data part is $a=26$ in VT1.5, $a=35$ in VT2, $a=53$ in VT3 and $a=107$ in VT6. The contents of the V1 and V2 bytes are already defined, however, the contents of the V3 and V4 are still undefined and reserved according to the SONET standards.

In the reception interface part 61, the synchronizing signal inserting means 64 inserts the frame synchronizing signal in an undefined VT path overhead part of each channel of the VT signal. As a result, the VT signal within the system has a timing for each channel, and it becomes unnecessary to use the conventional reference timing signal which is common to all channels.

Each part of the digital cross connect system carries out the signal processing in frame synchronism by detecting the frame synchronizing signal which is inserted in the undefined VT path overhead part. For example, in the transmission interface part 63, the phases of frames of the VT signal are matched for each channel after the cross connection in the switching part 62 based on the detected frame synchronizing signal. Then, the channels of the VT signal having the matched frame phase are multiplexed and converted into the line signal and output.

The frame synchronizing signal may be inserted in either one of the V3 and V4 bytes. However, the V3 byte may not necessarily exist in each cycle and cause a deterioration of the frame synchronizing characteristic. For this reason, it is preferable to use the V4 byte for the insertion of the frame synchronizing signal.

Figure 15:
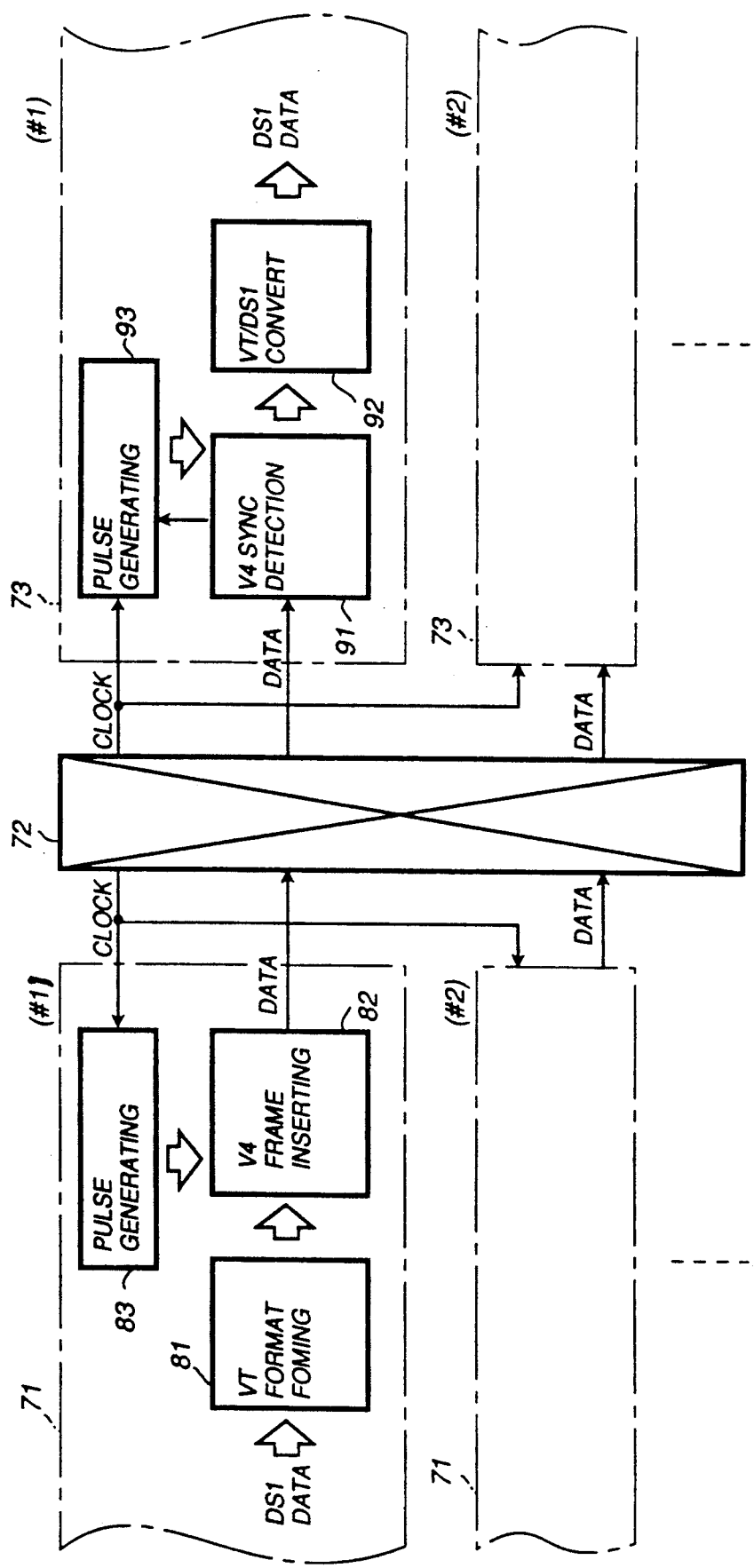
FIG. 15 is a system block diagram showing the second embodiment of the digital cross connect system according to the present invention.

FIG.15 generally shows the second embodiment of the digital cross connect system according to the present invention. The digital cross connect system includes a plurality of reception interface circuits 71, a switching circuit 72, and a plurality of transmission interface circuits 73.

Each reception interface circuit 71 receives a DS1 signal which includes a plurality of channels and converts this DS1 signal into the VT signal. Each reception interface circuit 71 includes a VT format forming part 81, a V4 frame inserting part 82 and a pulse generating part 83. The VT format forming part 81 converts the input line signal such as the DS1 signal into the VT signal having the VT frame format. The V4 frame inserting part 82 inserts the frame synchronizing signal in the V4 byte of the VT frame format which is formed by the VT format forming part 81. The pulse generating part 83 generates various timing clock signals which are used within the reception interface circuit 71.

The VT signals from the reception interface circuits 71 are supplied to the switching circuit 72. The switching circuit 72 cross connects the received VT signals.

After the cross connection in the switching circuit 72, the VT signal of each channel is supplied to the transmission interface circuit 73. Each transmission interface circuit 73 includes a V4 synchronous detection part 91, a VT-to-DS1 (VT/DS1) converter part 92 and a pulse generating part 93. The V4 synchronous detection part 91 detects and extracts the frame synchronizing signal from the V4 byte part within the received VT signal. The frame synchronization is achieved based on the extracted frame synchronizing signal, and the VT/DS1 converter part 92 converts the VT signal into the line signal such as the DS1 signal. The pulse generating part 93 generates various timing clock signals which are used within the transmission interface circuit 73.

FIG.16 shows the frame format of the VT1.5 which is used within the system. In FIG.16, V1, V2, V3 and V4 respectively denote the V1, V2, V3 and V4 bytes (VT path overhead parts), I denotes an information part, O denotes a fixed "0" overhead part, C1 and C2 denote stuff control bits, S1 and S2 denote stuff bits, and R denotes a reserve bit. In this VT frame format, the V1 and V2 bytes are already defined. The frame synchronizing signal having a fixed pattern "11101000", for example, is inserted in the V4 byte which is still undefined by the SONET standards. A path checking data is inserted in the V3 byte as will be described later.

Next, a more detailed description will be given of this embodiment. When the DS1 signal is input to the reception interface circuit 71 as the line signal, for example, this DS1 signal is converted into the VT signal having the VT frame format in the VT format forming part 81. Furthermore, the V4 frame inserting part 82 inserts the frame synchronizing signal "11101000" in the undefined (reserved) V4 byte within the VT signal. This VT signal having the frame synchronizing signal inserted therein is supplied to the switching circuit 72 and subjected to the cross connection. The cross connected VT signal is then supplied to the transmission interface circuit 73.

In the transmission interface circuit 73, the V4 synchronous detection part 91 detects the inserted frame synchronizing signal within the V4 byte of the VT signal for each channel and achieves the frame synchronization of the VT signal. The channels of the VT signal are multiplexed and converted into the DS1 signal in the VT/DS1 converter part 92. The VT/DS1 converter part 92 transmits the DS1 signal.

Even in the case where the input signal to the reception interface circuit 71 is the OC signal the termination of which is not permitted, the V1, V2, V3 and V4 bytes of the VT frame format within this OC signal can be terminated. For this reason, it is possible to insert the frame synchronizing signal in the V4 or V3 byte, similarly as described above.

Figure 17:
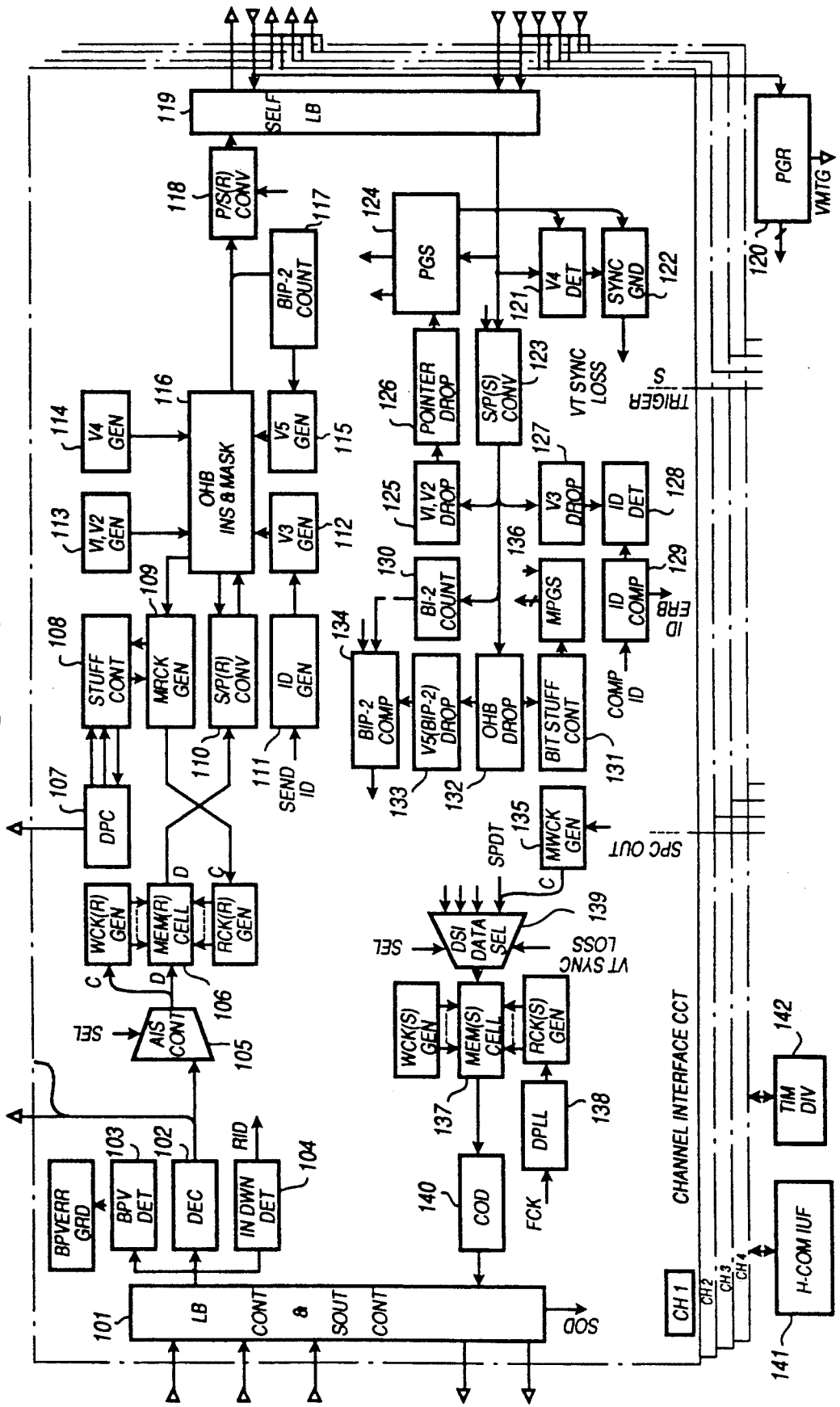
FIG. 17 is a system block diagram showing an embodiment of a channel interface circuit.

FIG.17 shows an embodiment of a channel interface circuit of the digital cross connect system in more detail. In this embodiment shown in FIG.17, the reception interface circuit 71 and the transmission interface circuit 73 are assembled into a single unit. Each of the blocks within the unit have the following functions.

An LB control block 101 mainly carries out a local loop back and a self check loop back, and also controls output data.

A DEC block 102 decodes AMI data or B8ZS code which is input in unipolar and converts the AMI data or the B8ZS code into NRZ data.

A BPV detection block 103 supervises unipolar data and detects and outputs a pattern which does not conform to the bipolar coding scheme.

An IN DOWN detection block 104 supervises input data and input clock signal and detects no-pulse of 175±75 bits.

An AIS control block 105 switches the output data to a memory block 106 when the input discontinuity is detected in the IN DOWN detection block 104.

The memory block 106 synchronizes the phase of the R side input data to the clock within the system and converts the transmission speed.

A DPC block 107 supervises the phase of the R side memory block 106 and carries out a stuff control.

A stuff control block 108 carries out the stuff control based on a stuff request output from the DPC block 107.

An MRCK generation block 109 generates a clock for reading out data from the memory block 106.

An S/P control block 110 converts the data read out from the memory block 106 into an 8-bit parallel data suited for the data processing in the subsequent stages.

An ID generation block 111 converts a path ID input from a microcomputer into a path ID format.

A V3 generation block 112 sections the checking data formed in the ID generation block 111 into 8 bits and inserts the 8 bits into the V3 byte.

V1,V2 generation block 113 inserts NDF, VT size and 10-bit pointer in the V1 and V2 bytes.

A V4 generation block 114 inserts the frame synchronizing pattern into the V4 byte.

A V5 generation block 115 inserts a result of the operation carried out in a BIP-2 counter block 117 or the like into the V5 byte.

An OHB insertion mask block 116 forms a VT format data by inserting and masking the V1, V2, V3, V4 and V5 bytes, the R bite, the surplus bits such as the O bit, the service bit and the like.

The BIP-2 counter block 117 makes a parity count of the data which excludes the V1, V2, V3 and V4 bytes within the VT data.

A P/S conversion block 118 converts the parallel data for internal processing blocks into a serial data.

A SELF control block 119 carries out a loop back at the time of the self check.

A PGR block 120 forms various pulses which are used in the reception side VT format conversion block.

A V4 detection block 121 detects the frame synchronizing pattern inserted in the V4 byte from the data which has passed the switching circuit 72.

A synchronization protection block 122 carries out a synchronization protection.

An S/P conversion block 123 converts the input serial data into 8-bit parallel data so as to carry out the internal processing in 8 parallel bits.

A PGS block 124 forms various pulses which are used in the transmission side VT format conversion block.

V1,V2 drop block 125 detects and outputs the V1 and V2 bytes from the transmission side input data.

A pointer detection block 126 detects a 10-bit pointer within the V1 and V2 bytes and carries out a stuff control and the like.

A V3 drop block 127 detects and outputs the V3

An ID detection block 128 receives the path check data inserted in the V3 byte and outputs the path ID in synchronism therewith.

An ID comparing block 129 compares the path ID which is detected and output by the ID detection block 128 and a reference path ID which is written by a microcomputer, and judges an error.

A BIP-2 counter block 130 counts a parity count of the VT data which excludes the V1, V2, V3 and V4 bytes.

A BIT stuff control block 131 supervises the C1 and C2 bits of the VT data and controls the S1 and S2 bits according to a majority vote of 3 bits.

An OHB drop block 132 detects and outputs an overhead byte such as the V5 byte from the VT data which excludes the V1, V2, V3 and V4 bytes.

A V5 (BIP-2) drop block 133 detects and outputs the BIP-2 data from the V5 byte which is output from the OHB drop block 132.

A BIP-2 comparing block 134 compares the BIP-2 data which is output from the V5 (BIP-2) drop block 133 and the result of the operation in the BIP-2 counter block 130 and makes a judgement thereon.

An MWCK generation block 135 generates a clock for writing the DS1 data into a memory block 137.

An MPG S block 136 forms pulses for separating data having the V5 byte at the head.

The memory block 137 converts the transmission speed of the data having the VT1.5 rate to the data having the DS1 rate.

A DPLL block 138 supervises the write and read timings of the S side memory block 137 and digitally generates a clock so as to present phase error.

A DS1 data selection block 139 selects the DS1 output data.

A COD block 140 converts the NRZ data into unipolar data. The AMI data or B8ZS code is selectable depending on the setting.

A microcomputer interface block ("μ-COMIUF") 141 provides an interface with the microcomputer and carries out various setting and monitoring operations.

A TIM DIV block 142 forms a timer for detecting various alarms within the LSI.

This embodiment is suited for a case where the transparency of the system is not required.

In the digital cross connect system, several hundred to several thousand channels are arbitrarily cross connected generally in the DS1 signal level. And for system maintenance, it is necessary to check and confirm whether or not the cross connect control information and the actually carried out cross connection match. This path check must be made accurately and at a high speed.

Conventionally, the signal transmission rate within the system is 1.576 Mbps. Hence, when the frame structure shown in FIG.2 is used, the it is possible to cover a DS1 signal speed variation from 1.5413 MHz to 1.55122 MHz, and the stuff rate is approximately 5/18.

Figure 2:
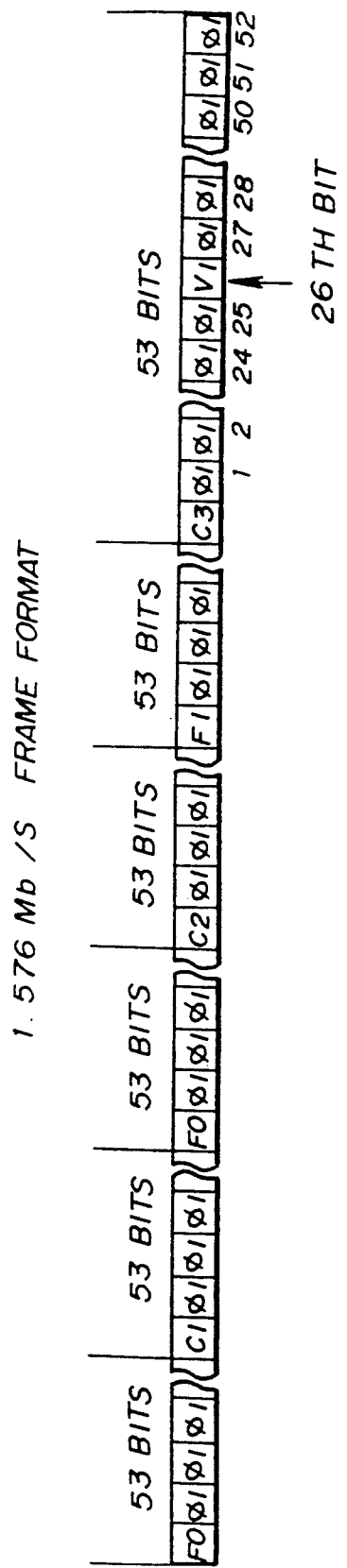
FIG. 2 is a frame format used within the conventional digital cross connect system shown in FIG.1.
Figure 18:
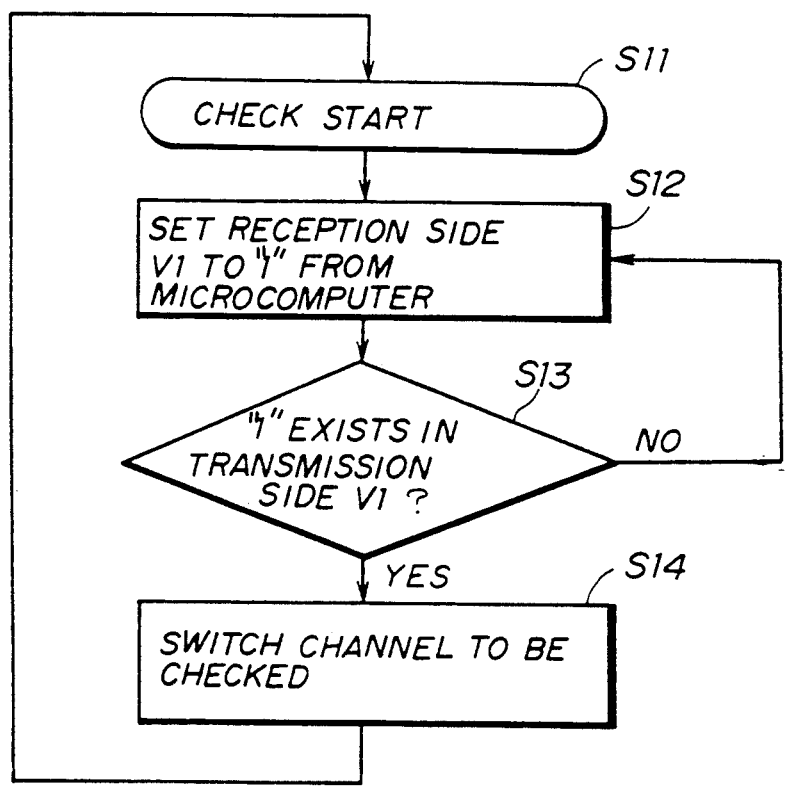
FIG. 18 is a flow chart for explaining a conventional path check.

Conventionally, the path check to confirm whether or not the cross connect control information and the actual cross connection match is made as shown in FIG.18 using the time slot V1 for the stuff within the frame shown in FIG.2.

In FIG.18, a step S11 starts the path check. A step S12 sets the V1 bit of the channel to be checked on the reception side to "1" from a microcomputer. A step S13 judges whether or not "1" exists in the V1 bit on the transmission side. The process returns to the step S12 when the judgement result in the step S13 is NO. On the other hand, when the judgement result in the step S13 is YES, a step S14 switches the channel which is to be checked and the process returns to the step S11.

Figure 1:
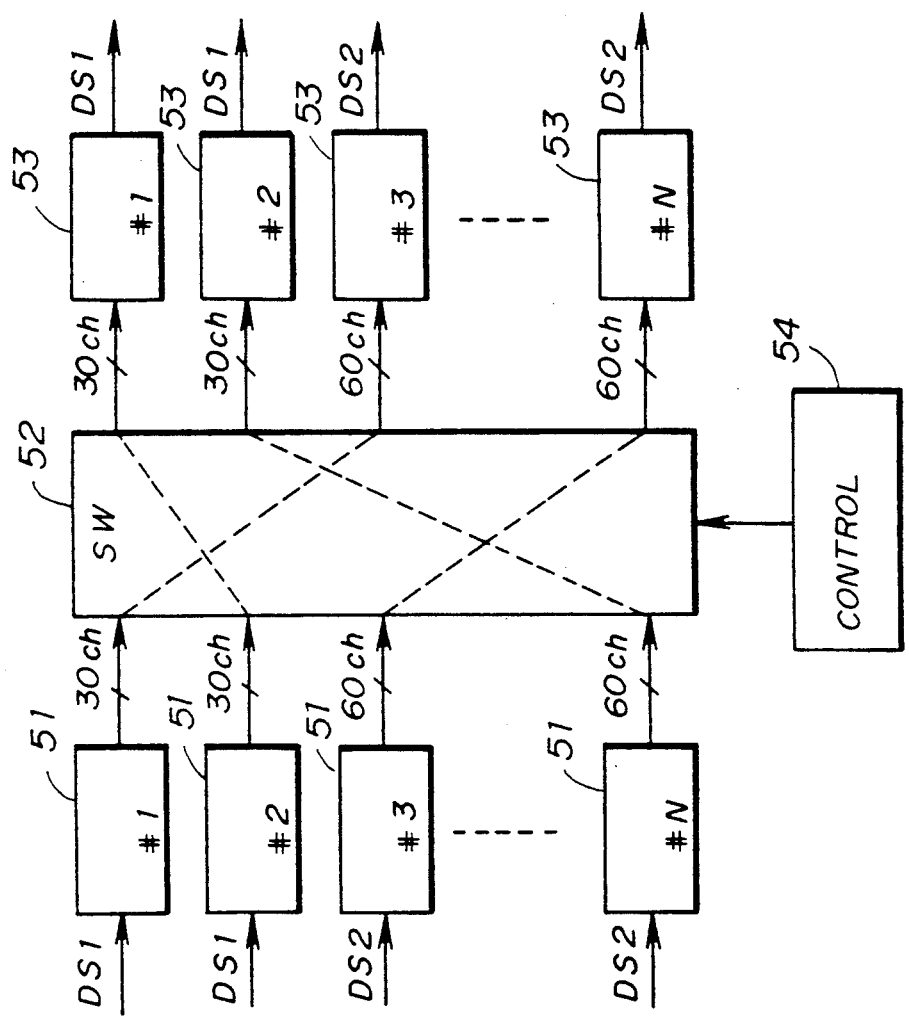
FIG. 1 is a system block diagram showing an example of a conventional digital cross connect system.

In other words, when the V1 bit is normally the stuff bit in the reception interface part 51 shown in FIG.1, a value "0" is set to the V1 bit for all channels. In addition, when the path check is to be made for a certain channel, a value "1" is set to only the V1 bit of the channel which is to be checked and the V1 bit of other channels is set to "0" based on an instruction from the microcomputer within the control part 54.

The above signals are cross connected in the switching part 52 and are input to the transmission interface parts 53. The transmission interface part 53 supervises the V1 bit within the input signal. The transmission interface parts 53 receive the cross connect control information from the microcomputer in advance. Hence, by comparing the cross connect control information and the actual cross connection obtained from the V1 bit information within the reception signal, each transmission interface part 53 can check and confirm whether or not the cross connection in the switching part 52 is correctly made. The result of this path check is fed back to the microcomputer from each transmission interface part 53.

The path check described above is made for each channel, that is, successively made one channel at a time. For this reason, when the system includes over 2000 channels, for example, it takes a considerably long time to make the path check for all the channels. Especially because the V1 bit which is used for the path check does not always exist, the path check must wait until the V1 bit occurs, thereby further increasing the time required to make the path check.

In addition, when making the path check, the microcomputer makes an access to the reception interface part 51 to set "1" to the V1 bit and an access to the transmission interface part 53 to receive the result of the path check. In other words, the microcomputer must make at least two accesses to the channel interface parts, and such accesses must be made repeatedly for all the channels. As a result, the load on the microcomputer is quite large.

Furthermore, since the information bit used for the path check consists only of one bit which is set in the V1 bit, an accurate path check cannot be made if an error occurs in the V1 bit. Accordingly, the reliability of the path check is relatively low.

Next, a description will be given of an embodiment in which a reliable path check can be made at a high speed without putting excessive load on the microcomputer.

First, a description will be given on the operating principle of a third embodiment of the digital cross connect system according to the present invention, by referring to FIG.14.

In the reception interface part 61, signal path check information is inserted in an undefined VT path overhead part within the VT signal. This signal path check information is detected in the transmission interface part 63 so as to make the path check.

In this embodiment, the VT frame format defined by the SONET standards is used for the signal processing within the system. Hence, the digital cross connect system can not only cross connect the conventional line signals such as the ASYNC-DS3, DS2, DS1C and DS1 but also the OS signals (for example, OC1, OC3, STS-1 and VT1.5) in conformance with the SONET standards.

The VT frame format is as described above in conjunction with FIG.3.

The undefined VT path overhead part of the VT signal is used for the path check. In other words, the reception interface part 61 inserts the signal path check information in the undefined VT path overhead part V3 or V4 of each channel, and the signals including the signal path check information are cross connected in the switching part 62.

The transmission interface part 63 supervises the content of the undefined VT path overhead part V3 or V4 of the cross connected signal and compares the detected content with the cross connect control information which is received in advance from the microcomputer. Based on this comparison, the transmission interface part 63 can make the path check and confirm whether or not the cross connection in the switching part 62 is carried out correctly.

The signal path check information may be inserted into either one of the undefined VT path overhead parts V3 and V4. However, when the frame synchronizing signal is inserted in the V4 byte for the frame synchronization within the system as in the case of the second embodiment, the signal path check information should be inserted in the V3 byte. The V3 byte does not always exist. Hence, the frame synchronizing characteristic may deteriorate if the frame synchronizing signal is inserted in the V3 byte. However, even if the signal path check information is inserted in the V3 byte, the path check is not greatly affected thereby.

Figure 19:
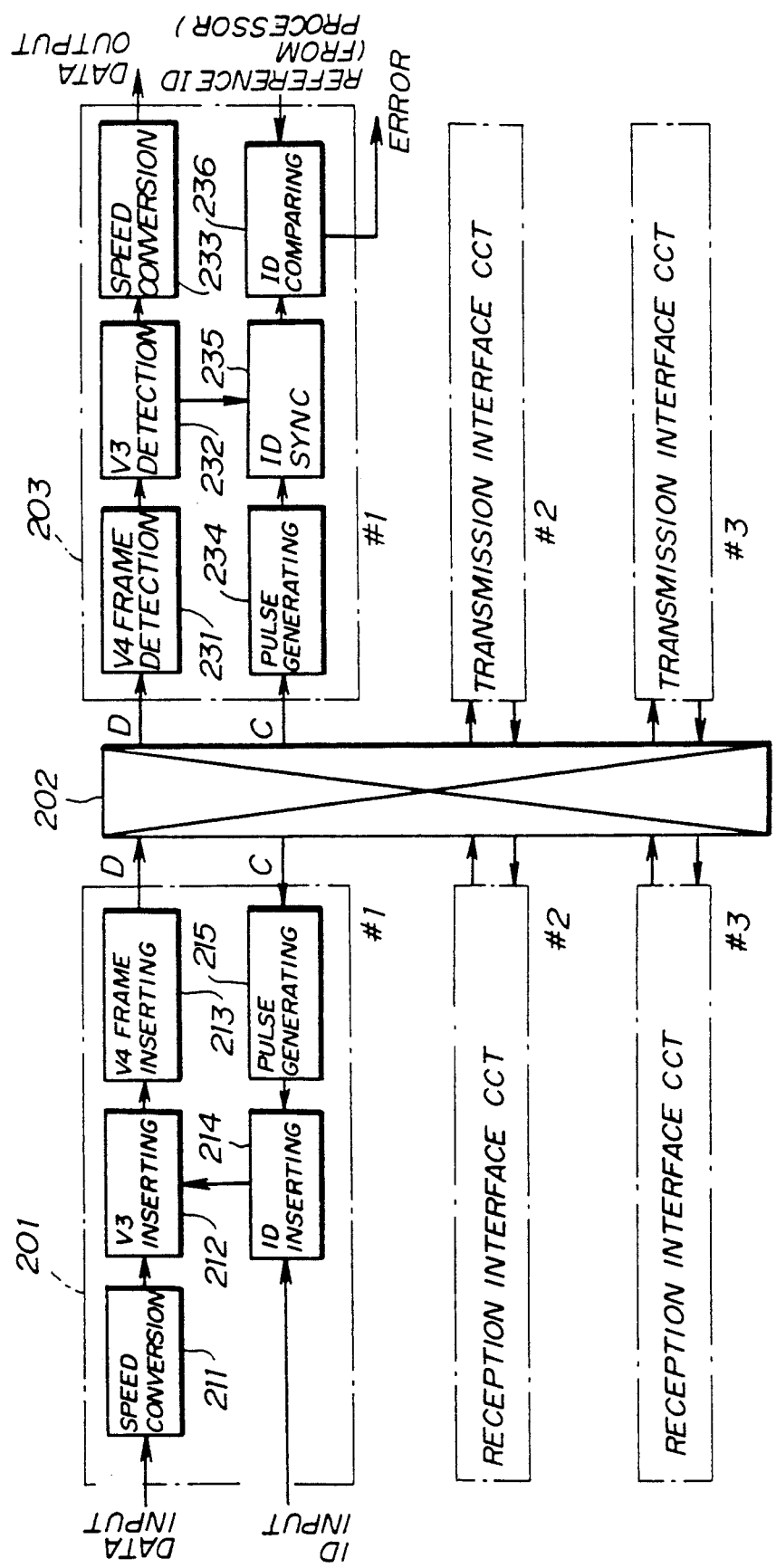
FIG. 19 is a system block diagram showing a third embodiment of the digital cross connect system according to the present invention.

Next, a more detailed description will be given of the third embodiment, by referring to FIG.19. The digital cross connect system includes a plurality of reception interface circuits 201, a switching circuit 202 and a plurality of transmission interface circuits 203.

The reception interface circuit 201 receives a DS1 signal or a VT1.5 signal in conformance with the SONET standards, including a plurality of channels. Each reception interface circuit 201 has a speed conversion part 211, a V3 inserting part 212, a V4 frame inserting part 213, an ID inserting part 214 and a pulse generating part 215.

The speed conversion part 211 converts the format of the input line signal into the VT frame format with which the signal processing is carried out within the system, and converts the transmission speed of the line signal. The V3 inserting part 212 successively inserts in the V3 byte within the VT frame format a path check data sequence which is received from the ID inserting part 214 and includes a path ID code as the signal path check information. The V4 frame inserting part 213 inserts the frame synchronizing signal in the V4 byte within the VT frame format. The pulse generating part 215 generates various timing clock signals which are used within the reception interface circuit 201.

The VT signals from the reception interface circuits 201 are supplied to the switching circuit 202, and the switching circuit 202 cross connects each channel of the VT signals. The channels of the cross connected VT signals are supplied to the transmission interface circuits 203.

Each transmission interface circuit 203 has a V4 frame detection part 231, a V3 detection part 232, a speed conversion part 233, a pulse generating part 234, an ID synchronizing part 235 and an ID comparing part 236.

The V4 frame detection part 231 detects the frame synchronizing signal in the V4 byte within the received VT signal. The V3 detection part 232 detects the V3 byte within the VT signal. The speed conversion part 233 converts the format and the transmission speed of the VT signal to those of the line signal. The pulse generating part 234 generates various timing clock signals which are used within the transmission interface circuit 203. The ID synchronizing part 235 detects the path ID code by synchronizing the path check data sequence in the V3 byte within the VT signal which is detected in the V3 detection part 232 to the frame synchronizing signal which is included within the same data. The ID comparing part 236 compares the path ID code which is detected in the ID synchronizing part 235 with a reference ID code which is received from the microcomputer and outputs a path check result ERROR.

The frame format of the VT1.5 which is used within the system is as shown in FIG.16. As described above, the V1 and V2 bytes are defined but the V3 and V4 bytes are undefined. Hence, the frame synchronizing signal having a fixed pattern "11101000" is inserted in the V4 byte, and the path check data (information) is inserted in the V3 byte.

Figure 20:
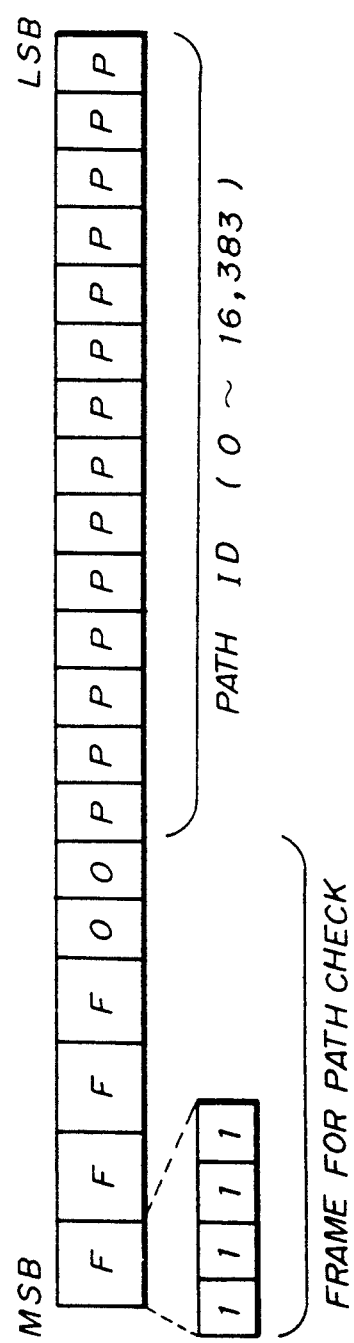
FIG. 20 shows a frame format of a path check data.

FIG.20 shows a frame format of the path check data. The frame of the path check data has a data length of 32 bits, and 18 bits are used for the frame identification (frame synchronization) used for the check while 14 bits are used for the channel ID data. The 32-bit data is sectioned into 4 bytes respectively made up of 8 bits. The 4 bytes are successively inserted into the V3 byte of the VT frame format.

Next, a description will be given of the path check process with reference to FIG.21.

Figure 21:
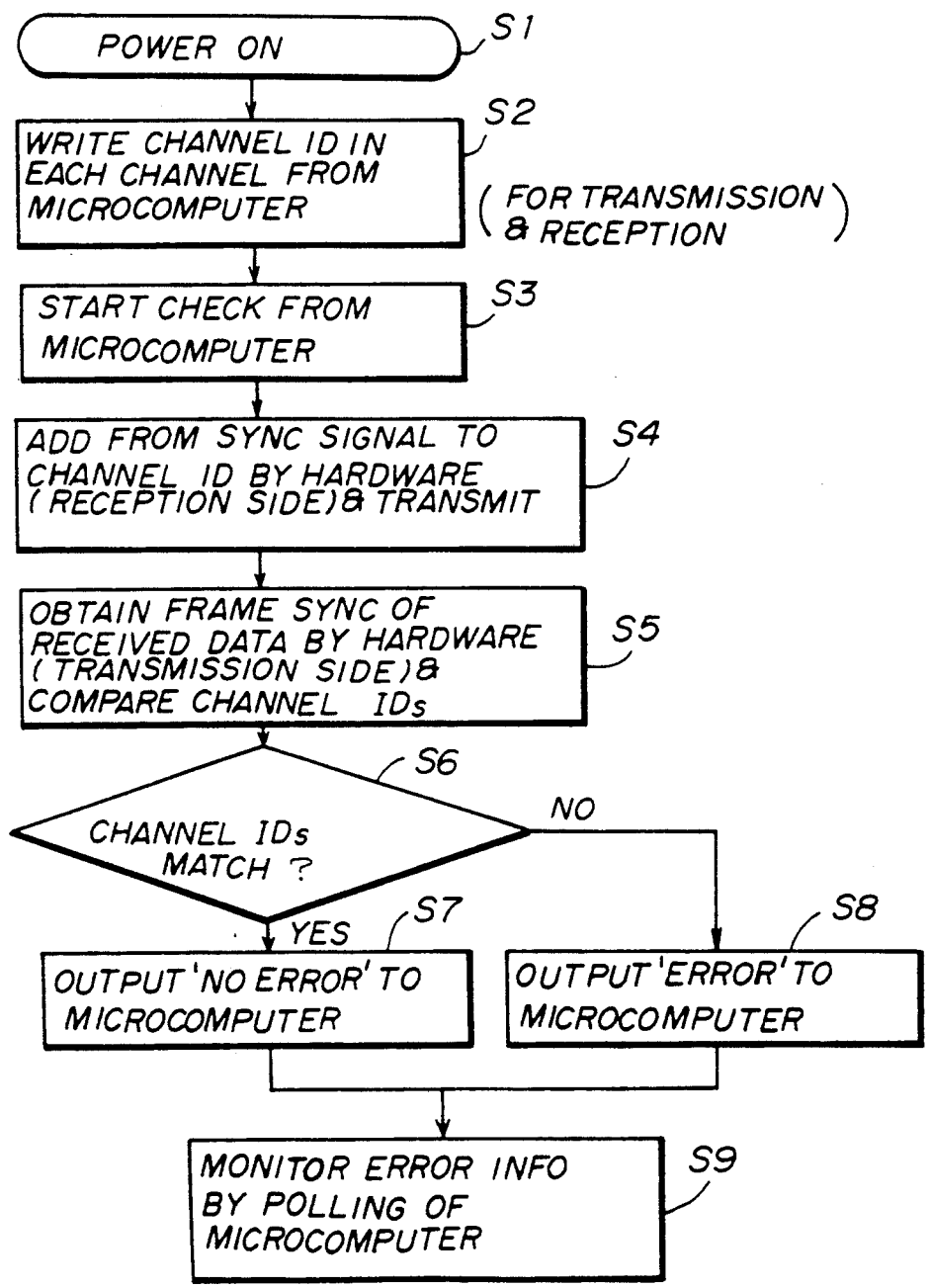
FIG. 21 is a flow chart diagram showing an essential part of the first embodiment in more detail.

In FIG.21, the power source is turned ON in a step S1. When the DS1 signal or the VT1.5 signal is received at the reception interface circuit 201, the speed conversion part 211 converts the received signal into the VT signal having the VT frame format. The microcomputer writes the ID code of each channel into the ID inserting part 214 in a step S2, and starts the path check in a step S3.

First, the V3 inserting part 212 inserts the path check data sequence shown in FIG.20 into the V3 byte of the VT signal in a step S4. In addition, the V4 frame inserting part 213 inserts the frame synchronizing signal into the V4 byte of the VT signal, and the VT signal including the path check data sequence and the frame synchronizing signal is supplied to the switching circuit 202 to be cross connected in a step S4.

In the transmission interface circuit 203, the V4 frame detecting part 231 detects the frame synchronizing signal which is inserted in the V4 byte of the received VT signal sp as to achieve frame synchronization of the received VT signal. Furthermore, the V3 detecting part 232 detects the V3 byte of the received signal after the frame synchronization. The ID synchronizing part 235 synchronizes the path ID code included in the V3 byte by use of the path identification frame and detects the path ID code by providing an appropriate number of protection stages. The path ID code is supplied to the ID comparing part 236.

The reference ID code which is obtained from the cross connect information received from the microcomputer is written in the ID comparing part 236. The ID comparing part 236 compares this reference ID code with the ID code received from the ID synchronizing part 235 in a step S5, and makes the path check based on a result of this comparison. Depending on whether or not the compared IC codes match, it is possible to judge in a step S6 whether or not an error has occurred in the cross connection made in the switching circuit 202.

The result of the judgement in the step S6 is latched and output as a check result data to the microcomputer in a step S7 when the judgement result in the step S6 is YES and in a step S8 when the judgement result in the step S6 is NO. The above described process is carried out by hardware and independently for each channel. The microcomputer monitors the check result data latched by the hardware by a polling process in a step S9.

In this embodiment, in the reception interface circuit 201, the microcomputer only needs to write the check data including the channel ID data in the ID inserting part 214 once, independently for each channel. Hence, even when the path check is repeated many times, the number of accesses made by the microcomputer to the reception interface circuit 201 is only one unless a failure such as a cut off of the power supply occurs for the particular unit.

In addition, in the transmission interface circuit 203, if the reference ID code is written into the ID comparing part 236 once, there is no need for the microcomputer to write data unless there is a change in the cross connection (change in the signal path) or a cut off of the power supply occurs for the particular unit. Hence, the number of accesses made by the microcomputer to the transmission interface circuit 203 is also only one.

The path check is made independently by hardware in each transmission interface circuit 203. The microcomputer can thus enter the check result data which are latched by the hardware by simply carrying out a polling process.

Therefore, the load on the microcomputer (the required number of steps) is considerably reduced compared to the conventional system, and thus, the time required to make the path check is greatly shortened.

Moreover, in this embodiment, the check data is transmitted using the V3 byte (8 bits) of the VT signal. For this reason, there is a margin in the information transmitting quantity for the path check, and it is possible to take the channel IF data format including the frame synchronizing signal. When making the path check using such a channel ID code which includes the frame synchronizing signal, it is possible to detect the ID code by providing an appropriate number of protection stages while achieving frame synchronization in the check part which is provided in the transmission interface circuit 203. Consequently, it is possible to greatly reduce the error of the channel ID code, thereby making it possible to make a more accurate path check.

In the conventional system which transmits the channel ID data which has the added frame synchronizing signal using the stuff bits, the period per "1" bit is 700 μs in average and the frame period becomes 22.4 ms when transmitting the channel ID data which has the added frame synchronizing signal and has a total data length of 32 bits, for example. But in this embodiment, the frame period is only 2 ms for the same data length of 32 bits.

Hence, the speed with which the channel ID data with the added frame synchronizing signal is transmitted is quite fast compared to that achievable by the conventional system.

Of course, the system shown in FIG.17 may be also be used in this embodiment.

Figure 22:
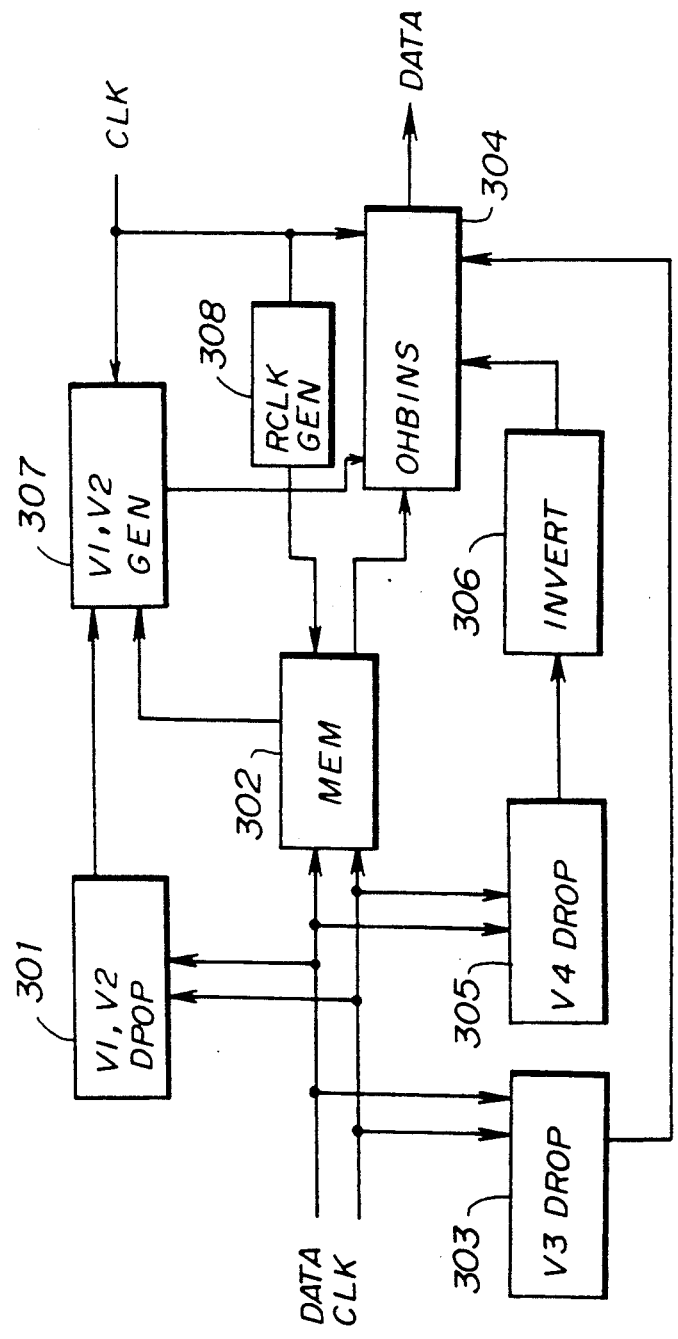
FIG. 22 is a system block diagram showing an essential part of the embodiments of the digital cross connect system related to the switching circuit.

Next, a description will be given of an essential part of the first embodiment of the digital cross connect system described above, by referring to FIG.22. The system shown in FIG.22 is similar to a part of the system shown in FIG.17 and corresponds to the reserved byte coding part 31 shown in FIG.11. But instead of inserting the frame synchronizing signal having a fixed pattern, one or a plurality of predetermined bits of the V4 byte are inverted in the first embodiment.

In FIG.22, a block 301 drops the V1 and V2 bytes from the input VT signal. On the other hand, a block 303 drops the V3 byte of the input VT signal and a block 304 drops the V4 byte of the input VT signal. Hence, a block 302 stores the input VT signal excluding the V1, V2, V3 and V4 bytes. One or a plurality of predetermined bits of the V4 byte are inverted in a block 306 and supplied to a block 304. On the other hand, the V3 byte is supplied directly to the block 304. A block 307 generates the V1 and V2 bytes based on the V1 and V2 bytes from the block 301 in response to an output of the block 302, and the generated V1 and V2 bytes are supplied to the block 304. A block 308 generates a read clock which is supplied to the block 302, and the read VT signal from the block 302 is supplied to the block 304. Hence, the block 304 reconstructs the VT signal having the VT frame format with the inserted frame synchronizing signal.

Figure 23:
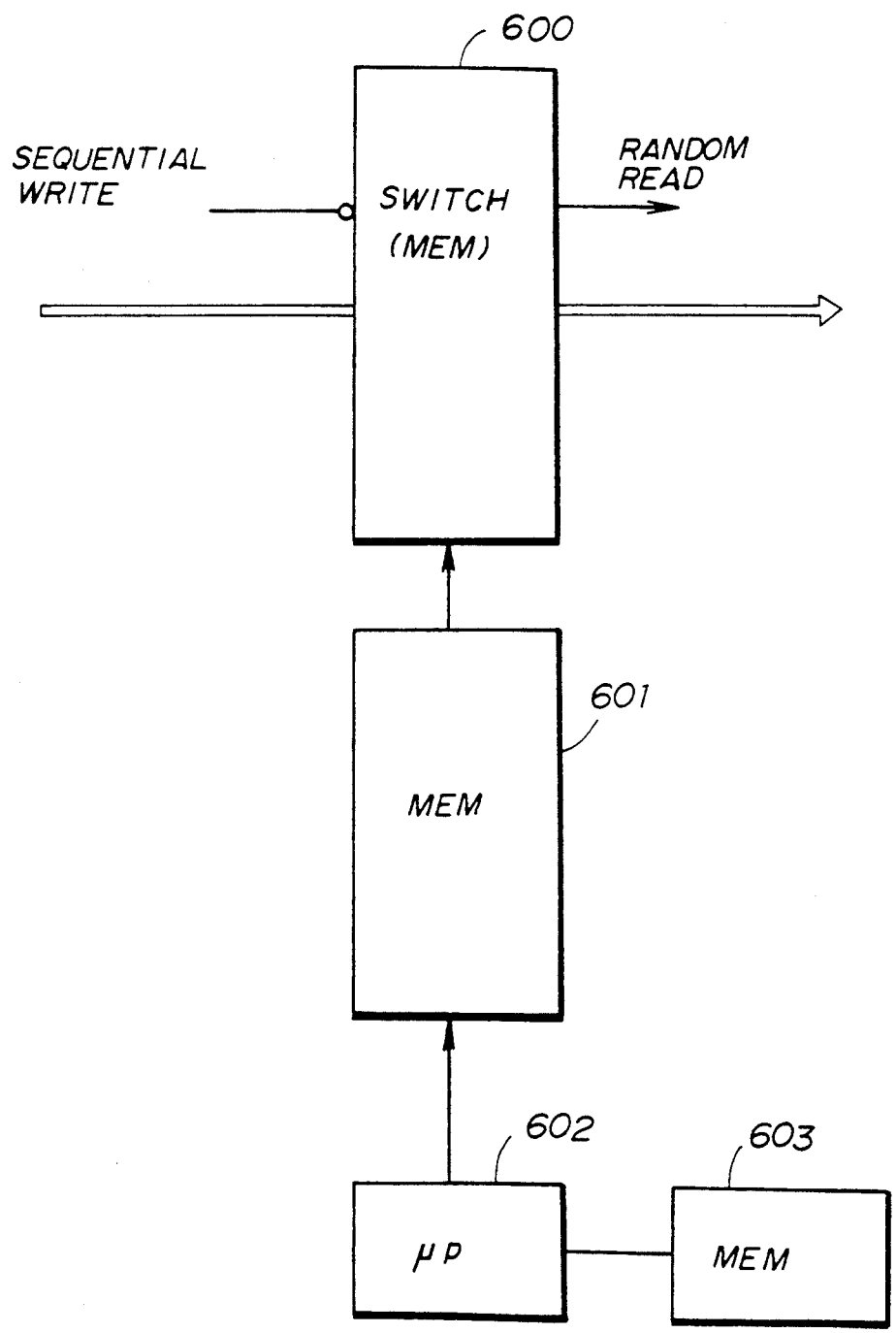
FIG. 23 is a system block diagram for explaining a microcomputer used in the embodiments.

FIG.23 is a block diagram for explaining the microcomputer mentioned in the first through third embodiments of the digital cross connect system. In FIG.23, a switching part 600 corresponds to the switching parts or circuits 22, 62, 72 and 202 of the described embodiments. A memory 603 stores data and programs for use by a microcomputer 602, and the cross connection of the switching part 600 is controlled by the microcomputer 602 via a memory 601. In this embodiment, the switching part 600 is a kind of a memory. The memories 601 and 603 and the microcomputer 602 correspond to the control part such as the control part 54 shown in FIG.1 which controls the cross connection. In the figures other than FIG.1, the illustration of the control part is omitted for the sake of convenience.

Further, the present invention is not limited to these embodiments, but various variations and modifications may be made without departing from the scope of the present invention.

What is claimed is:

1. A digital cross connect system, comprising:
   first interface means including a plurality of first interface circuits for converting an input line signal into a VT signal having a reserved path overhead part having at least one predetermined bit, and the VT signal having a VT frame format in conformance with synchronous optical network standards;
   switching means for cross connecting the VT signal received from said first interface means forming a cross connected VT signal; and
   second interface means including a plurality of second interface circuits for converting the cross connected VT signal received from said switching means into a line signal, each of the plurality of first interface circuits of said first interface means including signal inserting means for inserting a frame synchronizing signal within the reserved path overhead part of the VT signal, said signal inserting means including producing means for producing the frame synchronizing signal by inverting the at least one predetermined bit of the reserved path overhead part of the VT signal, and each of the plurality of second interface circuits of said second interface means including synchronization means for achieving frame synchronization of the VT signal in response to the frame synchronizing signal.

2. The digital cross connect system as claimed in claim 1, wherein said signal inserting means inserts the frame synchronizing signal having a fixed pattern.

3. The digital cross connect system as claimed in claim 1, wherein the VT signal is selected from a group consisting of VT1.5, VT2, VT3 and VT6 signals.

4. The digital cross connect system as claimed in claim 1, wherein the input line signal received by said first interface means and the line signal output from said second interface means are selected from a group consisting of ASYNC-DS3, DS2, DS1C and DS1.

5. The digital cross connect system as claimed in claim 1, wherein the reserved path overhead part of the VT signal is a V3 or V4 byte within the VT frame format.

6. The digital cross connect system as claimed in claim 1, wherein each of the plurality of first interface circuits of said first interface means further includes path check information inserting means for inserting signal path check information within the reserved path overhead part of the VT signal, and each of the plurality of second interface circuits of said second interface means further includes path check means for making a path check by detecting the signal path check information.

7. The digital cross connect system as claimed in claim 6, wherein the VT frame format comprises a V3 and V4 byte, and the signal path check information is inserted within the V3 byte of the VT frame format, and the frame synchronizing signal is inserted with the V4 byte of the VT frame format.

* * * * *